United States Patent Office 3,245,983
Patented Apr. 12, 1966

3,245,983
6-(α,α,α-TRISUBSTITUTED-ACETAMIDO)PENICIL-
LANIC ACIDS AND SALTS THEREOF
Frank Peter Doyle, Betchworth, and John Herbert Charles
Nayler, Catford, London, England, assignors to
Beecham Group Limited, Brentford, England, a British
company
No Drawing. Continuation of applications Ser. No.
858,337, Dec. 9, 1959, Ser. No. 3,479, Jan. 20, 1960,
and Ser. Nos. 3,502–3,510, Jan. 20, 1960. This application Aug. 28, 1961, Ser. No. 134,120
Claims priority, application Great Britain, Jan. 22, 1959,
2,435/59; Oct. 22, 1959, 35,546/59; Oct. 26, 1959,
36,204/59; Nov. 11, 1959, 38,304/59
13 Claims. (Cl. 260—239.1)

This application is a continuation of our prior, copending applications, Serial Number 858,337, filed December 9, 1959 and Serial Numbers 3,479, 3,502, 3,503, 3,504, 3,505, 3,506, 3,507, 3,508, 3,509 and 3,510 all filed January 20, 1960, and all now abandoned.

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to 6-(α,α,α-trisubstituted acetamido)penicillanic acids and nontoxic salts thereof.

6-aminopenicillanic acid has the structural formula:

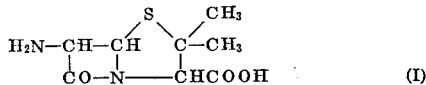

(I)

and is prepared according to Batchelor et al. (Nature, 183, 257–258, January 24, 1959), or Belgian Patent 569,728.

It has now been found according to this invention that a particularly useful class of derivatives is obtained by the reaction with 6-aminopenicillanic acid of an acid chloride, bromide, anhydride or mixed anhydride derived from a tri-substituted acetic acid.

Antibacterial agents such as benzylpenicillin have proved highly effective in the past in the therapy of infections due to Gram-positive bacteria but suffer from the drawback of being ineffective against numerous so-called resistant strains of bacteria, e.g., penicillin-resistant strains of Staphylococcus aureus (Micrococcus pyogenes var. aureus) which produce penicillinase. Many of the compounds of the present invention, in addition to their potent antibacterial activity, exhibit resistance to destruction by acid or by penicillinase or are effective against benzylpenicillin-resistant strains of bacteria or inhibit penicillinase and thus potentiate the action of benzylpenicillin when admixed therewith and are safe for use in patients who cannot be given benzylpenicillin because they exhibit allergic reactions thereto.

The present invention therefore provides new penicillins having the structural formula:

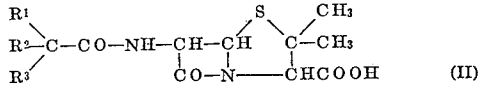

(II)

where $R^1$ and $R^2$ are the same or different and are each a halogen atom or an alkyl, alkenyl, aryl, aralkyl, cycloalkyl or heterocyclic group which groups may be substituted, or $R^1$ and $R^2$ together with the carbon atom to which they are attached form an aromatic, cycloaliphatic, or heterocyclic ring system, and $R^3$ is any one of the groups defined under $R^1$ and $R^2$, or the group $OR^4$ or $SR^4$ where $R^4$ is an alkyl, alkenyl, aryl, aralkyl or cycloalkyl group and nontoxic salts thereof.

The salts are nontoxic salts including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzyl-ethylenediamine, dehydroabietylamine, N,N'-bis-dehydroabietylethylenediamine, and other amines which have been used to form salts with benzylpenicillin. Also included within the scope of the present invention are easily hydrolyzed esters which are converted to the free acid form by chemical or enzymatic hydrolysis.

One preferred class of new penicillins according to the present invention has the structural Formula II above in which $R^1$ is a substituted aromatic ring, at least one of the substituents being a hydroxy group, and $R^2$ and $R^3$ are the same or different and are each $R^1$ or an alkyl, aryl or aralkyl group which may be substituted.

A further class has the structural Formula II in which $R^1$ is a substituted or unsubstituted benzene ring, $R^2$ is an alkyl group or an alkoxy group each of which group contains from 1 to 6 carbon atoms inclusive, and $R^3$ is any one of the groups defined under $R^1$ and $R^2$.

A still further class has the structural formula:

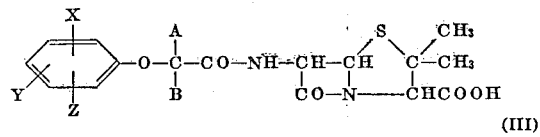

(III)

where X, Y and Z are the same or different and are each hydrogen, nitro, or a halogen atom or an amino, alkylamino, dialkylamino, acylamino, alkanoylamino, alkyl, alkoxy, hydroxy, sulphamyl, benzyl, cyclohexyl, cyclopentyl or trifluoromethyl groups and A and B are the same or different and are each an alkyl, phenyl or phenylalkyl group.

The present invention further provides a process for the preparation of new penicillins having the general Formula II in which 6-aminopenicillanic acid, or the fermentation liquor containing 6-aminopenicillanic acid obtained by growing a penicillin-producing mould in a nutrient medium with or without subsequent partial purification is reacted with an acid chloride, bromide, anhydride or mixed anhydride (with other carboxylic acids, including monoesters, and particularly lower aliphatic esters, of carbonic acid) derived from a trisubstituted acetic acid of the general formula:

(IV)

where $R^1$, $R^2$ and $R^3$ are as defined above.

The following are examples of carboxylic acids of the general Formula IV [the abbreviations "Ph," "Me" and "Et" are used herein for the phenyl, methyl and ethyl groups respectively]—

(a) Triaryl type:

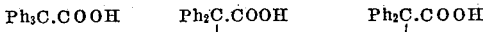

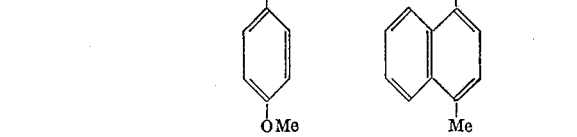

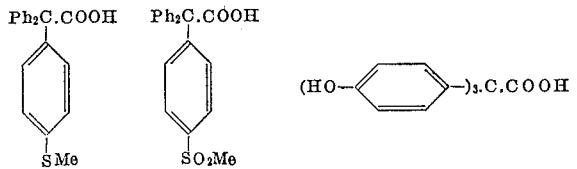

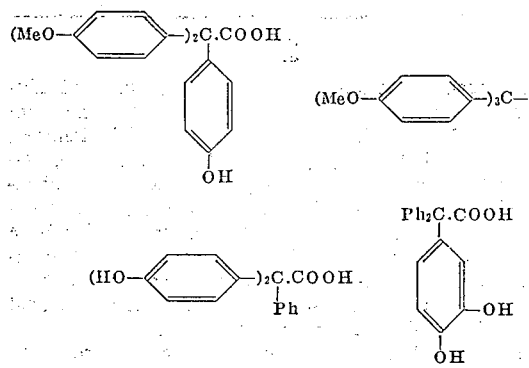

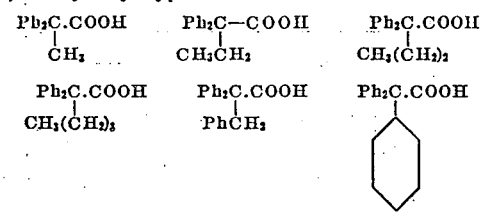

(b) *Diarylalkyl type:*

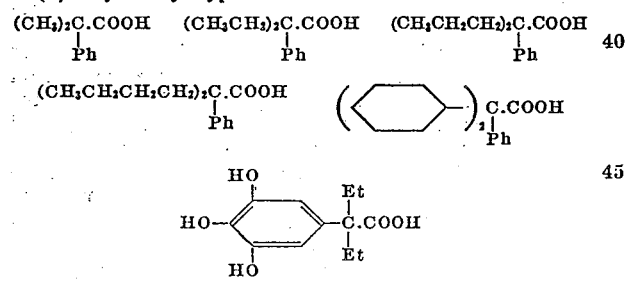

(c) *Aryldialkyl type:*

(d) *Trialkyl type:*

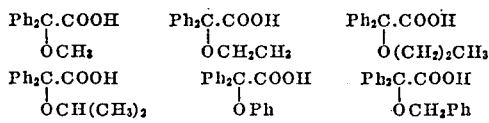

(e) *Diaryl (substituted oxy) type:*

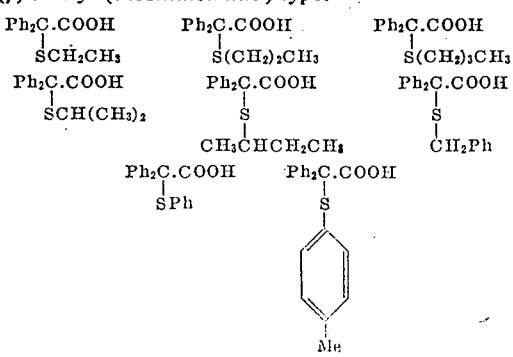

(f) *Diaryl (substituted thio) type:*

(g) *Dialkyl (substituted oxy) type:*

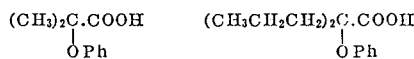

(h) *Dialkyl (substituted thio) type:*

(i) *Arylalkyl (substituted oxy or thio) type:*

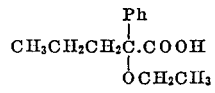

(j) *Diaryl heterocyclic type:*

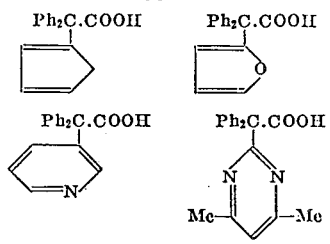

(k) *1-arylcycloalkyl type:*

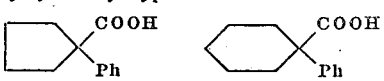

(l) *9-substituted 9-fluorenyl type:*

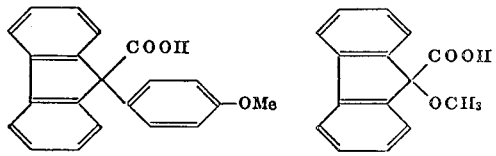

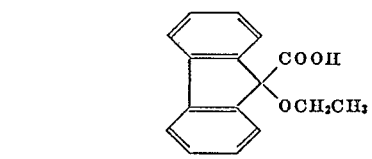

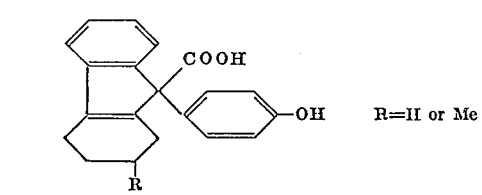

(m) *Miscellaneous:*

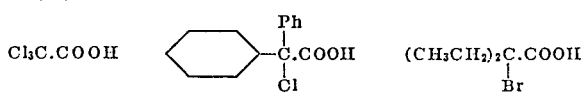

In those cases where the acid contains a grouping such as amino or alkylamino which might react with an acylating agent, such a group may be protected in the conventional manner prior to formation of the acid chloride, bromide, anhydride or mixed anhydride. The subsequent removal of the protecting group to form the free amino-substituted or alkylamino-substituted penicillin can be effected by catalytic hydrogenation, e.g., with palladium or platinum on barium carbonate or on carbon. Suitable protecting groups are the trityl group and groups of the general formula R″—O—CO— wherein R″ is an allyl, benzyl, substituted benzyl, phenyl or substituted phenyl.

Alternatively, those penicillins wherein the substituent is an amino group may be prepared by forming the corresponding nitro penicillin which is then hydrogenated by conventional means to form the amino derivative.

When an acid chloride, acid bromide or acid anhydride is used in a process of the present invention, it is prepared from the corresponding trisubstituted acetic acid according to the techniques set forth in the chemical literature, e.g., for acids such as diphenylacetic acid or as described in examples below. In instances where the trisubstituted acetic acid has not been described, it is prepared by the methods described in the chemical literature for simpler members of the series or by methods described or referred to in the examples below or by the methods described or referred to in "The Chemistry of the Carbon Compounds," Richter-Auschutz, Third English Edition, vol. I, pp. 296–309, 419, and vol. III, pp. 555–558 (1946), Elsevier Publishing Co., Inc., New York, New York, or in "Chemistry of Carbon Compounds," E. H. Rodd, Editor, vol. I, pp. 573–579, 788 et sub., vol. II, pp. 110–112, 220–224, and vol. III, pp. 434, 593–601, 1127–1134, 1202–1203 (1952), Elsevier Publishing Co., Inc., New York, New York, or in "Organic Preparations" by Weygand, pp. 159–162, 197, 299–300 (1945), Interscience Publishers Inc., New York, New York, especially with regard to hydrolysis to the desired acid of the corresponding amide or nitrile or in United States Patents 2,854,450 and 2,479,297 or in J. Amer. Chem. Soc., 70, 1153 (1948), or in Acta. Chem. Scand., 7, 596–602 (1953).

One method for preparing a compound of the present invention by way of mixed anhydride with ethoxy or isobutoxy-carbonic acid comprises mixing an acid of the general Formula IV with isobutyl chloroformate and a tertiary hydrocarbonyl or aliphatic amine such as triethylamine in an anhydrous, inert and preferably water-miscible solvent such as p-dioxane and, if desired, pure dry acetone, for about thirty minutes in the cold. To this solution of the mixed anhydride there is then added a chilled solution of 6-aminopenicillanic acid and tertiary hydrocarbonyl amine, e.g., triethylamine in a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing an aqueous solution of 6-aminopenicillanic acid and sodium bicarbonate, adding an acid chloride derived from an acid of the general Formula IV and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulphuric acid, and the free acid form of the product is extracted into ether. This ethereal extract is dried, as with anhydrous sodium sulphate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by the corresponding acid bromide or acid anhydride.

Since some of the antibiotic substances obtained by the process of this invention are relatively unstable compounds which readily undergo chemical changes resulting in the loss of antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substances.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solution of crude 6-aminopenicillanic acid, use can be made of organic solvents which do not contain reactive hydrogen atoms. Examples of such inert solvents are dimethylformamide, dimethylacetamide, chloroform, acetone, methylisobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is of course advisable when more than one phase is present, e.g., solid and liquid or two liquid phases.

At the conclusion of the reaction, the products are isolated if desired by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate in dry n-butanol. The potassium salt forms, precipitates, usually in crystalline form, and is collected by filtration or decantation.

It is sometimes preferred to prepare the new penicillins from the original fermentation liquor, containing 6-aminopenicillanic acid or one of its intermediate concentrates.

Some of the new penicillins of the present invention have shown a particular advantage in that they are less readily destroyed by penicillinase than the conventional penicillins G and V. The following table shows the relative activity of one of these new compounds as compared with penicillin G when tested against three hospital-resistant strains of staphylococci in vitro.

| Compound | Minimum Inhibitory Concentration | | |
|---|---|---|---|
| | Resistant Strain 1 | Resistant Strain 2 | Resistant Strain 3 |
| Ph.CH$_2$.CO.NH.— <br>           S <br> CH—CH  C.Me$_2$ <br> \|   \|       \| <br> CO—N———CH.CO$_2$H <br> Penicillin G | 1:4,000 (250 mcg./ ml.) | 1:400,000 (2.5 mcg./ ml.) | 1:1,000,000 (1 mcg./ ml.) |
| Ph$_3$.C.CO.NH.— <br>           S <br> CH—CH  C.Me$_2$ <br> \|   \|       \| <br> CO—N———CH.CO$_2$H | 1:3,200,000 (0.3 mcg./ ml.) | 1:6,400,000 (0.16 mcg./ ml.) | 1:6,400,000 (0.16 mcg./ ml.) |

The following examples illustrate the invention (these examples are grouped according to the system of classification of tri-substituted acetic acids hereinbefore set forth):

(a) TRIARYL TYPE

*Example 1.—Triphenylmethylpenicillin*

(i) *Crude sodium salt.*—A solution of triphenylacetyl chloride (0.8 g.) in chloroform (10 ml.) was added during 5 minutes to a suspension of 6-aminopenicillanic acid 0.5 gm. in chloroform (20 ml.) and triethylamine (1 ml.). After stirring at room temperature for 1 hour the solution was filtered and the solvent evaporated in vacuo at low temperature. The semi-solid residue was stirred in n-butanol (50 ml.) and water (30 ml.), was added, followed by sufficient N. hydrochloric acid to reduce the pH of the aqueous phase to 2.0. After shaking, the aqueous layer was discarded and the butanol washed twice further with very dilute hydrochloric acid. The penicillin was obtained from the butanol layer by shaking it with sufficient sodium bicarbonate solution to give a neutral aqueous phase (pH 7), separating the latter, and removing water at low temperature and pressure to leave the crude sodium salt of triphenylmethyl penicillin as a pale yellow solid (0.9 g.). It inhibited Staph. aureus at a concentration of 0.3 mcg./ml., the benzylpenicillin-resistant Staph. 1. at 0.6 mcg./ml., and the benzylpenicillin-resistant Staph. 2. at 0.6 mcg./ml.

(ii) *Benzylamine salt.*—The crude sodium salt of triphenylmethylpenicillin (150 mg.) prepared according to (i) was suspended in water (15 ml.) covered with an equal volume of ether, and acidified to pH 2 with dilute hydrochloric acid so that upon shaking, the free penicillin acid passed into the ether layer. This ether solution was separated, washed with water, dried over anhydrous sodium sulphate, filtered, and treated with 2 ml. of a 2% solution of benzylamine in ether. The benzylamine salt of the penicillin was precipitated as an oil which slowly solidified on trituration, probably taking up water of crystallization from the atmosphere in the process. The resulting white powder was collected, washed with ether, and dried in a vacuum desiccator. Yield 65 mg., M.P. 98°–100° C. (decomp.). (Found: C, 66.9; H, 6.2; N, 6.8; S, 4.5. C$_{35}$H$_{35}$O$_4$N$_3$S, 2H$_2$O requires: C, 66.7; H, 6.2; N, 6.7; S, 5.1%.)

(iii) *Cyclohexylamine salt.*—A solution of of triphenylmethylpenicillin in ether was prepared from the crude sodium salt (180 mg.) as in (ii). Treatment with 2 ml. of a 2% solution of cyclohexylamine in ether precipitated the cyclohexylamine salt of the penicillin as a slightly deliquescent white powder of indefinite M.P. which was collected, washed with ether, and dried in a vacuum desiccator. Yield 90 mg. (Found: C, 66.6; H, 7.4; N, 6.9; S. 4.6. C$_{34}$H$_{39}$O$_4$N$_3$S, 2H$_2$O requires: C, 65.7; H, 7.0; N, 6.8; S, 5.1%.)

(iv) *N-methylmorpholine salt.*—A solution of triphenylmethylpenicillin in ether was prepared from the crude sodium salt (170 mg.) as in (ii). Treatment with 2 ml. of a 2% solution of N-methylmorpholine in ether precipitated the N-methylmorpholine salt of the penicillin as a colourless oil which slowly solidified when rubbed. The resulting white powder was collected, washed with ether, and dried in a vacuum desiccator. Yield 60 mg., M.P. 118–121° C. (decomp). (Found: C, 66.6; H, 6.3; N, 6.9; S, 5.3. C$_{33}$H$_{37}$O$_5$N$_3$S, 0.5H$_2$O requires: C, 66.4; H, 6.4; N, 7.0; S, 5.4%.)

(v) *Pure sodium salt.*—A solution of pure triphenylacetyl chloride (18.4 g.) in dry acetone (360 ml.) was added during 15 mins. to a stirred solution of 6-aminopenicillanic acid (13 g.) in a mixture of 3% aqueous sodium bicarbonate solution (500 ml.) and acetone (150 ml.). The mixture was stirred at room temperature for 3 hrs., then washed with ether (2 x 600 ml.). The aqueous layer was filtered to remove a little suspended solid and then cooled to −6° C., whereupon the product crystallized in glistening plates. It was collected (refrigerated centrifuge) and recrystallized by dissolution in 80% aqueous acetone (300 ml.) at room temperature followed by cooling to −6° C. The pure crystalline sodium salt was collected as before and dried in a vacuum desiccator to give a white powder (17.1 g., M.P. 100–120° C.) which appeared to be essentially the monohydrate. Further drying over phosphorus pentoxide at 80° C./0.4 mm., gave the anhydrous salt, M.P. 183°–190° C. (decomp.), but this was hygroscopic and on exposure to air the melting point quickly fell to 100–120° C.

A specimen for analysis was recrystallized and dried once more as described above. (Found: C, 65.9; H, 5.2; N, 5.2; S, 6.2; Na, 4.4. C$_{28}$H$_{25}$O$_4$N$_2$SNa required: C, 66.1; H, 5.0; N, 5.5; S, 6.4; Na, 4.5%.) $[\alpha]_D^{19}$+81° C. (1.5% in water).

(vi) *Pure potassium salt.*—This was prepared exactly as described in (v) above except that the equivalent quantity of potassium bicarbonate was substituted for sodium bicarbonate. After being isolated and dried as described for the sodium salt the anhydrous potassium salt had M.P. 199–201° C. (decomp.). (Found: C, 63.7; H, 4.8; N, 5.1; S, 5.8; K, 7.4. C$_{28}$H$_{25}$O$_4$N$_2$SK required: C, 64.1; H, 4.8; N, 5.3; S, 6.1; K, 7.4%.)

*Example 2.—Mono-p-hydroxytriphenylmethylpenicillin*

Mono-p-hydroxytriphenylacetyl chloride (7.2 g.) dissolved in dry acetone and added over about 7 minutes to a stirred solution of 6-aminopenicillanic acid (4.84 g.) in a mixture of aqueous sodium bicarbonate (150 ml. of 8.8%) and acetone (75 ml.). The mixture was stirred at room temperature for 3 hrs., diluted with water (50 ml.), and extracted with ether (2 x 100 ml.) only the aqueous phase being retained. This aqueous solution was covered with ether (80 ml.), acidified to pH 2 to 3 with N. hydrochloric acid (92 ml.), shaken, and the ether layer separated. The aqueous layer was extracted with two further 40 ml. portions of ether and the combined ether extracts (which at this stage contained the free penicillin acid) were washed with water (20 ml.) and then neutralized with 8.4% aqueous sodium bicarbonate (13.5 ml.), with vigorous shaking. The aqueous layer was separated and evaporated to dryness in vacuo at room temperature to give the sodium salt of mono-p-hydroxytriphenylmethyl penicillin as a yellow solid (6.8 g.).

It inhibited Staph. Oxford at a concentration of 0.5 mcg./ml., the benzylpenicillin-resistant Staph. 1. at 2.5 mcg./ml. and the benzylpenicillin-resistant Staph. 2. at 2.5 mcg./ml.

The required mono-p-hydroxytriphenylacetyl chloride was prepared as a viscous oil by the reaction of anhydrous mono-p-hydroxytriphenylacetic acid with thionyl chloride in benzene solution together with pyridine in catalytic amount. The reaction was effected by heating at 60–70° C. for 1 hour and the acid chloride isolated by concentrating the reaction mixture. Its purity was assessed by model reactions with aniline and ammonia in presence of water to give the anilide and amide respectively.

*Example 3.—Mono-p-methoxytriphenylmethylpenicillin*

A solution of mono-p-methoxytriphenylacetyl chloride (673 mg.) in dry chloroform (5 ml.) was added dropwise to a stirred mixture of 6-aminopenicillanic acid (432 mg.), chloroform (10 ml.), and triethylamine (0.84 ml.). The mixture was stirred at room temperature for 2½ hrs., and then filtered. The filtrate was treated with successive small portions of 0.2 N. hydrochloric acid, with vigorous shaking between additions, until the aqueous phase was at pH 2. The acid layer was separated and discarded, and the chloroform solution was washed with water (20 ml.). Sufficient 3% aqueous sodium bicarbonate solution was added to the chloroform solution to give, after vigorous shaking, a neutral emulsion (pH 7). This was evaporated at low temperature and pressure and the residual hygroscopic solid dried in a vacuum desiccator. There was obtained 817 mg. of the sodium salt of mono-p-methoxytriphenylmethylpenicillin.

The product inhibited *Staph. aureus* at a concentration of 0.5 mcg./ml., the benzylpenicillin-resistant Staph. 1. at 0.6 mcg./ml. and the benzylpenicillin-resistant Staph. 2. at 0.6 mcg./ml.

The mono-p-methoxytriphenylacetyl chloride was prepared from the corresponding acid by heating with thionyl chloride and a trace of pyridine in benzene, removing the solvent and excess reagent in vacuo and crystallizing the residue from light petroleum, M.P. 101–103° C.

*Example 4.—Mono-p-methylthiotriphenylmethyl-penicillin*

A solution of mono-p-pmethylthiotriphenylacetyl chloride (6.34 g.) in dry acetone (108 ml.) was added slowly to a stirred solution of 6-aminopenicillanic acid (3.89 g.) in 3% aqueous sodium bicarbonate (152 ml.) and acetone (45 ml.). The mixture was stirred at room temperature for 4 hrs., then washed with two 200 ml. portions of ether. The aqueous phase was covered with ether (50 ml.) and adjusted to pH 2 by the addition of N. hydrochloric acid. After separating the layers, the aqueous phase was extracted with two further 50 ml. portions of ether. The combined ether solutions (which at this stage contained the free penicillin acid) were washed with water and then shaken with sufficient 8% sodium bicarbonate solution to give a neutral aqeuous phase (pH 7). The layers were separated and the aqueous phase was evaporated at low temperature and pressure to leave the sodium salt of mono-p-methylthiotriphenylmethylpenicillin as a white solid, which was finally dried in a vacuum desiccator. Yield 7.44 g.

The product inhibited Staph. Oxford at a concentration of 0.025 mcg./ml., Staph. 1. at 0.25 mcg./ml., and Staph. 2. at 1.25 mcg./ml.

The mono-p-methylthiotriphenylacetyl chloride was prepared from the corresponding acid by heating with thionyl chloride and a trace of pyridine in benzene, removing the solvent and excess reagent in vacuo and crystallizing the residue from light petroleum, M.P. 103.5–105° C.

*Example 5.—Mono-p-methylsulphonyltriphenylmethyl-penicillin*

6-aminopenicillanic acid (4.32 g.) was acylated with mono-p-methylsulphonyltriphenylacetyl chloride (7.68 g.) as described in Example 4 to give the sodium salt of mono-p-methylsulphonyltriphenylmethylpenicillin as an almost white solid (9.23 g.).

It inhibited Staph. Oxford at a concentration of 0.6 mcg./ml., Staph 1. at 2.5 mcg./ml., and Staph 2. at 2.5 mcg./ml.

The mono-p-methylsulphonyltriphenylacetyl chloride was prepared from the corresponding acid by heating with thionyl chloride and a trace of pyridine in benzene, removing the solvent and excess reagent in vacuo, and crystallizing the residue from light petroleum, M.P. 146–148° C.

*Example 6.—α-(4-methyl-1-naphthyl)diphenylmethyl-penicillin*

6-aminopenicillanic acid (4.85 g.) was acylated with α-(4-methyl-1-naphthyl)diphenylacetyl chloride (8.3 g.) as described in Example 3 to give the sodium salt of α-(4-methyl-1-naphthyl)diphenylmethylpenicillin as a white solid (9.7 g.).

It inhibited Staph. Oxford at a concentration of 12.5 mcg./ml., Staph. 1. at 25 mcg./ml., and Staph. 2. at 25 mcg./ml.

The α-(4-methyl-1-naphthyl)diphenylacetyl chloride M.P. 176–177° C. (decomp.), was prepared by heating the corresponding acid in benzene with thionyl chloride and a trace of pyridine.

*Example 7.—Tri-(p-methoxyphenyl)methylpenicillin*

6-aminopenicillanic acid (2.94 g.) was acylated with crude tri-(p-methoxyphenyl)acetyl chloride (obtained by heating 5.14 g. of the corresponding acid in benzene with thionyl chloride, then removing the solvent and excess reagent in vacuo) according to the method described in Example 4, except that the solvent extractions were carried out with butanol instead of ether. There was obtained 3.44 g. of sodium salt of tri-(p-methoxyphenyl)-methylpenicillin as a slightly hygroscopic white powder.

It inhibited Staph. Oxford at a concentration of 5 mcg./ml., Staph. 1. at 12.5 mcg./ml., and Staph. 2. at 12.5 mcg./ml.

Tri-(p-methoxyphenyl)acetic acid, M.P. 212–213° C., was prepared in good yield by condensing anisilic acid with anisole in the presence of sulphuric and acetic acids.

*Example 8*

In the procedure of Example 2 the mono-p-hydroxy-triphenylacetyl chloride is replaced by an equimolar weight of the acid chloride of α-(4-chlorophenyl)-α,α-diphenylacetic acid,
α-(3-bromophenyl)-α,α-diphenylacetic acid,
α-(2-iodophenyl)-α,α-diphenylacetic acid,
α-(2-aminophenyl)-α,α-diphenylacetic acid,
α-(3-fluorophenyl)-α,α-dihpenylacetic acid,
α-(4-nitrophenyl)-α,α-diphenylacetic acid,
α-(4-dimethylaminophenyl)-α,α-diphenylacetic acid,
α-(3-ethylaminophenyl)-α,α-diphenylacetic acid,
α-(2-acetamidophenyl)-α,α-diphenylacetic acid,
α-(3,4-dimethylphenyl)-α,α-diphenylacetic acid,
α-(3,4-dichlorophenyl)-α,α-diphenylacetic acid,
α-(2-benzylphenyl)-α,α-diphenylacetic acid,
α-(3-cyclohexylphenyl)-α,α-diphenylacetic acid,
α-(4-sulfamylphenyl)-α,α-diphenylacetic acid,
α-(4-trifluoromethylphenyl)-α,α-diphenylacetic acid,
α-(3,4,5-trimethoxyphenyl)-α,α-diphenylacetic acid,
α-(2,4-dinitrophenyl)-α,α-diphenylacetic acid respectively to produce the acids 6-[α-(4-chlorophenyl)-α,α-diphenylacetamido]-penicillanic acid,
6-[α-(3-bromophenyl)-α,α-diphenylacetamido]-penicillanic acid,
6-[α-(2-iodophenyl)-α,α-diphenylacetamido]-penicillanic acid,
6-[α-(2-aminophenyl)-α,α-diphenylacetamido]-penicillanic acid,
6-[α-(3-fluorophenyl)-α,α-diphenylacetamido]-penicillanic acid,
6-[α-(4-nitrophenyl)-α,α-diphenylacetamido]-penicillanic acid, 6-[α-(4-dimethylaminophenyl)-α,α-diphenyl-
acetamido]penicillanic acid,
6-[α-(3-ethylaminophenyl)-α,α-diphenyl-
acetamido]penicillanic acid,
6-[α-(2-acetamidophenyl)-α,α-diphenyl-
acetamido]penicillanic acid,
6-[α-(3,4-dimethylphenyl)-α,α-diphenyl-
acetamido]penicillanic acid,
6-[α-(3,4-dichlorophenyl)-α,α-diphenyl-
acetamido]penicillanic acid,
6-[α-(2-benzylphenyl)-α,α-diphenylacetamido]
penicillanic acid,
6-[α-(3-cyclohexyphenyl)-α,α-diphenylacetamido]
pencillanic acid,
6-[α-(4-sulfamylphenyl)-α,α-diphenylacetamido]
penicillanic acid,
6-[α-(4-trifluoromethylphenyl)-α,α-diphenylacetamido]
penicillanic acid,
6-[α-(3,4,5-trimethoxyphenyl)-α,α-diphenylacetamido]
penicillanic acid,
6-[α-(2,4-dinitrophenyl)-α,α-diphenylacetamido]
penicillanic acid,
respectively, which are isolated as their solid, water-soluble sodium salts and found to inhibit *Staph. aureus* Smith at concentration of 0.001 percent by weight.

*Example 9*

In the procedure of Example 2, the mono-p-hydroxy-triphenylacetylchloride is replaced by an equimolar weight of the acid chloride of α-(3-chlorophenyl)-α-(4-hydroxyphenyl)-α-phenyl-
acetic acid,
α-(2-bromophenyl)-α,α-di(4-hydroxyphenyl)acetic acid,
α-(4-iodophenyl)-α-(4-methoxyphenyl)-α-phenylacetic
acid,
α-(2-aminophenyl)-α,α-di-(2-methoxyphenyl)acetic acid,
α-(4-nitrophenyl)-α,α-di-(4-methylphenyl)acetic acid,
α-(4-dimethylaminophenyl)-α-(2-methylphenyl)-α-
phenylacetic acid,
α-(3,4-dichlorophenyl)-α,α-di-(2-hydroxyphenyl)
acetic acid,
α,α,α-tri-(4-methylphenyl)acetic acid and
α,α,α-tri(3,4-dichlorophneyl)acetic acid, respectively to produce the acid 6-[α-(3-chlorophenyl)-α-(4-hydroxyphenyl)-α- phenyl-
acetamido]penicillanic acid,
6-[α-(2-bromophenyl-α,α-di-(4-hydroxyphenyl)
acetamido]penicillanic acid,
6-[α-(4-iodophenyl)-α-(4-methoxyphenyl)-α-phenyl-
acetamido]penicillanic acid,
6-[α-(2-aminophenyl)-α,α-di-(2-methoxyphenyl)acet-
amido]penicillanic acid,
6-[α-(4-nitrophenyl)-α,α-di(4-methylphenyl)ace-
tamido]penicillanic acid,
6-[α-(4-dimethylaminophenyl)-α-(2-methylphenyl)-
α-phenylacetamido]penicillanic acid,
6-[α-(3,4-dichlorophenyl)-α,α-di-(2-hydroxyphenyl)
acetamido]penicillanic acid,
6-[α,α,α-tri-(4-methylphenyl)acetamido]penicillanic acid,
6-[α,α,α-tri-(3,4-dichlorophenyl)acetamido]penicillanic
acid, respectively, which are isolated as their solid, water-soluble sodium salts and found to inhibit *Staph. aureus* Smith at concentrations of 0.001 percent by weight.

(b) DIARYLALKYL TYPE

*Example 10.—α,α-diphenylethylpenicillin*

A solution of α,α-diphenylpropionyl chloride (0.49 g.) in dry chloroform (6 ml.) was added dropwise to a stirred mixture of 6-aminopenicillanic acid (0.43 g.), chloroform (12 ml.), and triethylamine (0.84 ml.). Stirring was continued for 2½ hours and the mixture was then filtered to remove any solid which had failed to dissolve. The filtrate was treated with successive small portions of 0.2 N. hydrochloric acid, with vigorous shaking between additions, until the aqueous phase was at pH 2–3. The acid layer was separated and discarded, and the chloroform solution was washed with water (20 ml.). Sufficient 3% aqueous sodium bicarbonate solution was added to the chloroform solution to give, after vigorous shaking, a neutral emulsion (pH 7); this was evaporated at low temperature and pressure and the residual solid dried in a vacuum desiccator. There was obtained 0.80 g. of the sodium salt of α,α-diphenylethylpenicillin.

It inhibited *Staph. aureus* at a concentration of 0.025 mcg./ml., the benzylpenicillin-resistant Staph. 1. at 6 mcg./ml. and the benzylpenicillin-resistant Staph. 2. at 5 mcg./ml.

*Example 11.—α,α-diphenylpropylpenicillin*

α,α-diphenylbutyryl chloride (3.8 g.) in dry acetone (20 ml.) was added dropwise during 15 mins. to a stirred solution of 6-aminopenicillanic acid (3.2 g.) and sodium bicarbonate (3.7 g.) in water (60 ml.) and acetone (40 ml.). When addition was complete the mixture was stirred at room temperature for 3 hrs. then diluted with water (50 ml.) and extracted with two 60 ml. portions of ether, only the aqueous phase being retained. This aqueous solution was covered with ether (50 ml.) and adjusted to pH 2–3 by the addition of N. hydrochloric acid. After separating the layers, the aqueous phase was extracted with two 25 ml. portions of ether, adjusting to pH 2–3 each time. The combined ether solutions (which at this stage contained the free penicillin acid) were washed with water (50 ml.) and then shaken with sufficient 8% sodium bicarbonate solution to give a neutral aqueous phase (pH 7). The layers were separated and the ether phase was extracted with two 5 ml. portions of water to each of which was added sufficient bicarbonate solution to produce an aqueous phase of pH 7. Evaporation of the combined aqueous solutions at low temperature and pressure left the sodium salt of α,α-diphenyl-propylpenicillin, which was finally dried in a vacuum desiccator. Yield 5.2 g.

It inhibited *Staph. aureus* at a concentration of 0.006 mcg./ml., Staph. 1. at 1.25 mcg./ml., and Staph 2. at 1.25 mcg./ml.

*Example 12.—α,α-diphenylbutylpenicillin*

6-aminopenicillanic acid (3.6 g.) was acylated with α,α-diphenylvaleryl chloride (4.5 g.) as described in Example 1 to give the sodium salt of α,α-diphenylbutylpenicillin (6.3 g.)

It inhibited Staph. Oxford at a concentration of 0.12 mcg./ml., Staph. 1. at 1.25 mcg./ml., and Staph. 2. at 0.6 mcg./ml.

The α,α-diphenylvaleryl chloride, B.P. 120–122° C./0.2 mm., was prepared by heating α,α-diphenylvaleric acid with thionyl chloride in benzene.

*Example 13.—α,α-diphenylpentylpenicillin*

6-aminopenicillanic acid (2.6 g.) was acylated with α,α-diphenylhexoyl chloride (3.5 g.) as described in Example 10 to give the sodium salt of α,α-diphenylpentyl penicillin (5.8 g.).

It inhibited Staph. Oxford at a concentration of 0.25 mcg./ml., Staph. 1. at 1.25 mcg./ml., and Staph. 2. at 0.6 mcg./ml.

The α,α-diphenylhexoyl chloride, B.P. 142–144° C./0.3 mm., was prepared by heating α,α-diphenylhexoic acid with thionyl chloride in benzene. α,α-Diphenylhexoic acid (needles from aqueous ethanol, M.P. 131° C.) was itself obtained by alkylating diphenylacetonitrile with butyl bromide in the presence of sodamide, and hydrolyzing the resulting α,α-diphenylhexonitrile, M.P. 132° C./0.05 mm., with alcoholic potassium hydroxide at 150° C. under pressure.

Example 14.—α,α-Diphenylisobutylpenicillin 6-aminopenicillanic acid (3.25 g.) was acylated with α,α-diphenylisovaleryl chloride (4.27 g.) according to the procedure of Example 11 to give the sodium salt of α,α-diphenylisobutylpenicillin (2.37 g.).

It inhibited Staph. Oxford at a concentration of 0.5 mcg./ml., Staph. 1. at 10.0 mcg./ml., and Staph. 2., at 5.0 mcg./ml.

α,α-Diphenylisovaleryl chloride, M.P. 78–79° C., was prepared by the action of thionyl chloride on the corresponding acid.

Example 15

In the procedure of Example 10 the α,α-diphenylpropionyl chloride is replaced by an equimolar weight of the acid chloride of α-(4-nitrophenyl)-α-phenyl-n-butyric acid,
α-(4-bromophenyl)-α-(4-hydroxyphenyl)-n-valeric acid,
α-(4-t-butylphenyl)-α-(4-methoxyphenyl)-n-propionic acid,
α-(4-trifluoromethylphenyl)-α-(4-methylphenyl)-n-hexanoic acid,
α-(3-aminophenyl)-α-(2-hydroxyphenyl)-isovaleric acid,
α-(4-sulfamylphenyl)-α-(2-methoxyphenyl)-isobutyric acid,
α-(2-benzylphenyl)-α-(2-methylphenyl)-n-valeric acid,
α-(3-methoxyphenyl)-α-phenyl-n-decanoic acid,
α-(2-iodophenyl)-α-(3-hydroxyphenyl-n-propionic acid,
α-(3-diethylaminophenyl)-α-(3-methoxyphenyl)-n-valeric acid,
α-(4-cyclohexylphenyl)-α-(3-methylphenyl)-isohexanoic acid,
α-(4-methylaminophenyl)-α-phenyl-α-cyclobutylacetic acid,
α-(4-chlorophenyl)-α-(4-hydroxyphenyl)-α-cyclopentylacetic acid,
α-(2-acetamidophenyl)-α-(3-hydroxyphenyl)-α-cyclohexylacetic acid,
α-(3,4-dimethylphenyl)-α-(2-hydroxyphenyl)-α-cycloheptylacetic acid,
α-(3,4-dichlorophenyl)-α-phenyl-isohexanoic acid,
α-(3,4,5-trimethoxyphenyl)-α-phenyl-n-propionic acid,
α-(4-hydroxyphenyl)-α-phenyl-n-butyric acid,
α-(3,4-dihydroxyphenyl)-α-phenyl-n-propionic acid,
α-(4-methylthiophenyl)-α-phenyl-n-butyric acid,
α-(4-methylsulfonylphenyl)-α-phenyl-n-propionic acid and
α-(2,5-dimethyl-4-hydroxyphenyl)-α-phenyl-n-propionic acid, respectively, to produce the acids 6-[α-(4-nitrophenyl)-α-phenyl-n-butyramido]penicillanic acid,
6-[α-(4-bromophenyl)-α-(4-hydroxyphenyl)-n-valeramido]penicillanic acid,
6-[α-(4-t-butylphenyl)-α-(4-methoxyphenyl)-n-propionamido]penicillanic acid,
6-[α-(4-trifluoromethylphenyl)-α-(4-methylphenyl)-n-hexanoamido]penicillanic acid,
6-[α-(3-aminophenyl)-α-(2-hydroxyphenyl)-isovaleramido]penicillanic acid,
6-[α-(4-sulfamylphenyl)-α-(2-methoxyphenyl)-isobutyramido]penicillanic acid,
6-[α-(2-benzylphenyl)-α-(2-methylphenyl)-n-valeramido]penicillanic acid,
6-[α-(3-methoxyphenyl)-α-phenyl-n-decanoamido]penicillanic acid,
6-[α-(2-iodophenyl)-α-(3-hydroxyphenyl)-n-propionamido]penicillanic acid,
6-[α-(3-diethylaminophenyl)-α-(3-methoxyphenyl)-n-valeramido]penicillanic acid,
6-[α-(4-cyclohexylphenyl)-α-(3-methylphenyl)-isohexanoamido]penicillanic acid,
6-[α-(4-methylaminophenyl)-α-phenyl-α-cyclobutylacetamido]penicillanic acid,
6-[α-(4-chlorophenyl)-α-(4-hydroxyphenyl)-α-cyclopentylacetamido]penicillanic acid,
6-[α-(2-acetamidophenyl)-α-(3-hydroxyphenyl)-α-cyclohexylacetamido]penicillanic acid,
6-[α-(3,4-dimethylphenyl)-α-(2-hydroxyphenyl)-α-cycloheptylacetamido]penicillanic acid,
6-[α-(3,4-dichlorophenyl)-α-phenyl-isohexanoamido]-penicillanic acid,
6-[α-(3,4,5-trimethoxyphenyl)-α-phenyl-n-propionamido]penicillanic acid,
6-[α-(4-hydroxyphenyl)-α-phenyl-n-butyramido]-penicillanic acid,
6-[α-(3,4-dihydroxyphenyl)-α-phenyl-n-propionamido]-penicillanic acid,
6-[α-(4-methylthiophenyl)-α-phenyl-n-butyramido]-penicillanic acid,
6-[α-(4-methylsulfonylphenyl)-α-phenyl-n-propionamido]penicillanic acid and
6-[α-(2,5-dimethyl-4-hydroxyphenyl)-α-phenyl-n-propionamido]penicillanic acid, respectively, which are isolated as their solid, water-soluble sodium salts and found to inhibit Staph. aureus Smith at concentrations of 0.001 percent by weight.

Example 16

In the procedure of Example 10 the α,α-diphenylpropionyl chloride is replaced by an equimolar weight of the acid chloride of α,α-di-(4-hydroxyphenyl-n-propionic acid,
α,α-di-(2-hydroxyphenyl)-n-butyric acid,
α,α-di-(4-methylphenyl-n-valeric acid,
α,α-di-(3-methoxyphenyl)-n-hexanoic acid,
α,α-diphenyl-n-octanoic acid,
α,α-di-(3-hydroxyphenyl)isohexanoic acid,
α,α-di-(4-methoxyphenyl)-n-propionic acid,
α,α-diphenyl-α-cyclohexylacetic acid and
α,α-di-(4-hydroxyphenyl)-α-cyclopentylacetic acid, respectively to produce the acids 6-[α,α-di-(4-hydroxyphenyl)-n-propionamido]penicillanic acid,
6-[α,α-di-(2-hydroxyphenyl)-n-butyramido]penicillanic acid,
6-[α,α-di-(4-methylphenyl)-n-valeramido]penicillanic acid,
6-[α,α-di-(3-methoxyphenyl)-n-hexanoamido]penicillanic acid,
6-[α,α-diphenyl-n-octanoamido]penicillanic acid,
6[α,α-di-(3-hydroxyphenyl)isohexanoamido]penicillanic acid,
6[α,α-di-(4-methoxyphenyl)-n-propionamido]penicillanic acid,
6-[α,α-diphenyl-α-cyclohexylacetamido]penicillanic acid and
6-[α,α-di-(4-hydroxyphenyl)-α-cyclopentylacetamido]-penicillanic acid, respectively, which are isolated as their solid, water-soluble sodium salts and found to inhibit Staph. aureus Smith at concentrations of 0.001 percent by weight.

(c) ARYL DIALKYL TYPE

Example 17.—α,α-Dimethylbenzylpenicillin

A solution of α,α-dimethylphenylacetyl chloride (5.2 g.) in dry acetone (40 ml.) was added dropwise during 15 mins. to a stirred solution of 6-aminopenicillanic acid (5.6 g.) and sodium bicarbonate (6.5 g.) in water (90 ml.) and acetone (50 ml.). When addition was complete the mixture was stirred at room temperature for 2½ hrs., then diluted with water (50 ml.) and extracted with ether (180 ml. in 3 portions), only the aqueous phase being retained. This aqueous solution was covered with ether (50 ml.) and adjusted to pH 2–3 by the addition of N. hydrochloric acid. After separating the layers, the aqueous phase was extracted with two 25 ml. portions of ether, adjusting to pH 2–3 each time. The combined ether solutions (which at this stage contained the free penicillin acid) were washed with water (2 x 50 ml.) and then shaken with sufficient 8% sodium bicarbonate solution to give a neutral aqueous phase (pH 7). The layers were separated and the ether phase was extracted with two 5 ml. portions of water to each of which was added sufficient bicarbonate solution to produce an aqueous phase of pH 7. Evaporation of the combined aqueous solutions at low temperature and pressure left the sodium salt of α,α-dimethylbenzylpenicillin, which was finally dried in a vacuum desiccator, yield 9.5 g.

The product inhibited Staph. Oxford at a concentration of 0.025 mcg./ml., the benzylpenicillin-resistant Staph. 1. at 25 mcg./ml., and the benzylpenicillin resistant Staph. 2. at 25 mcg./ml.

*Example 18.—α,α-Diethylbenzylpenicillin*

6-aminopenicillanic acid (5.6 g.) was acylated with α,α-diethylphenylacetyl chloride (6.0 g.) as described in Example 17 to give the sodium salt of α,α-diethylbenzylpenicillin (8.3 g.).

It inhibited Staph. Oxford at a concentration of 0.05 mcg./ml., the benzylpenicillin-resistant Staph. 1. at 2.5 mcg./ml., and the benzylpenicillin-resistant Staph. 2. at 2.5 mcg./ml.

*Example 19.—α,α-Di-n-propylbenzylpenicillin*

6-aminopenicillanic acid (7.55 g.) was acylated with α,α-di-n-propylphenylacetyl chloride (8.35 g.) as described in Example 17 to give the sodium salt of α,α-di-n-propylbenzylpenicillin (13.0 g.).

It inhibited Staph. Oxford at a concentration of 0.05 mcg./ml., Staph. 1. at 1.25 mcg./ml. and Staph. 2. at 1.25 mcg./ml.

*Example 20.—α,α-Di-n-butylbenzylpenicillin*

6-aminopenicillanic acid (3.9 g.) was acylated with α,α-di-n-butylphenylacetyl chloride (4.8 g.) as described in Example 17 to give the sodium salt of α,α-di-n-butylbenzylpenicillin (6.5 g.).

It inhibited Staph. Oxford at 0.5 mcg./ml., Staph. 1. at 2.5 mcg./ml., and Staph. 2. at 2.5 mcg./ml.

*Example 21.—α,α-Dicyclohexylbenzylpenicillin*

A solution of α,α-dicyclohexylphenylacetyl chloride (3.8 g.) in dry chloroform (20 ml.) was added dropwise to a stirred mixture of 6-aminopenicillanic acid (2.6 g.), chloroform (50 ml.), and triethylamine (5 ml.). After the mixture had been stirred for 2½ hrs. a clear solution resulted. Successive small portions of 0.2 N. hydrochloric acid were added, with vigorous shaking between additions, until the aqueous phase was at pH 2, (at this point 1.84 g. of unreacted 6-aminopenicillanic acid separated and was recovered). The acid layer was separated and discarded, and the chloroform solution was washed with water (60 ml.). Sufficient 8% aqueous sodium bicarbonate solution was added to the chloroform solution to give, after vigorous shaking, a neutral emulsion (pH 7). This was evaporated at low temperature and pressure and the residual white solid dried in a vacuum desiccator. There was obtained 3.57 g. of the sodium salt of of α,α-dicyclohexylbenzylpenicillin.

It inhibited Staph. Oxford at a concentration of 125 mcg./ml., Staph. 1. at 62.5 mcg./ml., and Staph. 2. at 50 mcg./ml.

α,α-Dicyclohexylphenylacetyl chloride, M.P. 95–96° C., was prepared by heating the corresponding acid in benzene with thionyl chloride and a trace of pyridine.

*Example 22*

In the procedure of Example 17 the α,α-dimethylphenylacetyl chloride is replaced by an equimolar weight of the acid chloride of α-(4-nitrophenyl)-α-methylpropionic acid,
α-(4-bromophenyl)-α-ethylpropionic acid,
α-(4-t-butylphenyl)-α-isohexyl-n-butyric acid,
α-(4-trifluoromethylphenyl)-α-methyl-isovaleric acid,
α-(3-aminophenyl)-α-methyl-n-decanoic acid,
α-(4-sulfamylphenyl)-α-methyl-α-cyclobutylacetic acid,
α-(2-benzylphenyl)-α-ethyl-α-cyclopentaylacetic acid,
α-(3-methoxyphenyl)-α-isopropyl-α-cyclohexylacetic acid,
α-(2-iodophenyl)-α-n-butyl-α-cycloheptylacetic acid,
α-(3-diethylaminophenyl)-α-methyl-n-butyric acid,
α-(4-cyclohexylphenyl)-α-n-propyl-n-valeric acid,
α-(4-methylaminophenyl)-α,α-dicychohexylacetic acid,
α-(4-chlorophenyl)-α,α-dicyclopentylacetic acid,
α-(2-acetamidophenyl)-α-ethylpropionic acid,
α-(3,4-dimethylphenyl)-α-ethyl-n-butyric acid,
α-(3,4-dichlorophenyl)-α-ethyl-n-valeric acid,
α-(3,4,5-trimethoxyphenyl)-α-ethyl-n-hexanoic acid,
α-(4-hydroxyphenyl)-α-ethyl-n-octanoic acid,
α-(3,4-dihydroxyphenyl)-α-methyl-n-valeric acid,
α-(4-methylsulfonylphenyl)-α-n-hexpropionic acid and
α-(2,5-dimethyl-4-hydroxyphenyl)-α-methylpropionic acid, respectively, to form the acids 6-[α-(4-nitrophenyl)-α-methylpropionamido]penicillanic acid,
6-[α-(4-bromophenyl)-α-ethylpropionamido]penicillanic acid,
6-[α-(4-t-butylphenyl)-α-isohexyl-n-butyramido]penicillanic acid,
6-[α-(trifluoromethylphenyl)-α-methyl-isovaleramido] penicillanic acid,
6-[α-(3-aminophenyl)-α-methyl-n-decanoamido]penicillanic acid,
6-[α-(4-sulfamylphenyl)-α-methyl-α-cyclobutylacetamido]penicillanic acid,
6-[α-(2-benzylphenyl)-α-ethyl-α-cyclopentacetamido] penicillanic acid,
6-[α-(3-methoxyphenyl)-α-isopropyl-α-cyclohexylacetamido]penicillanic acid,
6-[α-(2-iodopheny)-α-n-butyl-α-cycloheptylacetamido] penicillanic acid,
6-[α-(3-diethylaminophenyl)-α-methyl-n-butyramido] penicillanic acid,
6-[α-(4-cyclohexylphenyl)-α-n-propyl-n-valeramido] penicillanic acid,
6-[α-(4-methylaminophenyl)-α,α-dicyclohexylacetamido] penicillanic acid,
6-[α-(4-chlorophenyl)-α,α-dicyclopentylacetamido] penicillanic acid,
6-[α-(2-acetamidophenyl)-α-ethylpropionamido]penicillanic acid,
6-[α-(3,4-dimethylphenyl)-α-ethyl-n-butyramido]penicillanic acid,
6-[α-(3,4-dichlorophenyl)-α-ethyl-n-valeramido]penicillanic acid,
6-[α-(3,4,5-trimethoxyphenyl)-α-ethyl-n-hexanoamido] penicillanic acid,
6-[α-(4-hydroxyphenyl)-α-ethyl-n-octanoamido]penicillanic acid,
6-[α-(3,4-dihydroxyphenyl)-α-methyl-n-valeramido] penicillanic acid,
6-[α-(4-methylthiophenyl)-α-methylpropionamido]penicillanic acid,
6-[α-(4-methylsulfonylphenyl)-α-n-hexylpropionamido] penicillanic acid, and
6-[α-(2,5-dimethyl-4-hydroxyphenyl)-α-methylpropionamido]penicillanic acid, respectively, which are isolated as their solid, water-soluble sodium salts and found to inhibit *Staph. aureus* Smith as concentrations of 0.001 percent.

(d) TRIALKYL TYPE

*Example 23.—Tert. butylpenicillin*

6-aminopenicillanic acid (4.0 g.) was treated with trimethylacetyl chloride (2.5 g.) as described in Example 1 to give the sodium salt of tertiary butyl penicillin as a yellow hygroscopic solid (3.7 g.). It inhibited Staph. aureus at a concentration of 2.5 mcg./ml.

*Example 24.—Triethylmethylpenicillin*

A solution of triethylacetylchloride (0.98 g.) in dry chloroform (15 ml.) was added dropwise during 5 mins. to a stirred mixture of 6-aminopenicillanic acid (1.3 g.), dry chloroform (30 ml.), and triethylamine (2.5 ml.). The mixture was stirred at room temperature for 2½ hrs. and then filtered. The filtrate was washed with 0.2 N hydrochloric acid (60 ml.) and then with water (60 ml.). Sufficient 3% aqueous sodium bicarbonate solution was added to the chloroform solution to give, after vigorous shaking, a neutral emulsion (pH 7). This was evaporated at low temperature and pressure and the residue was dried in a vacuum desiccator to leave the sodium salt of triethylmethylpenicillin as a white solid (1.84 g.).

It inhibited Staph. Oxford at a concentration of 0.05 mcg./ml., the benzylpenicillin-resistant Staph. 1. at 12.5 mcg./ml., and the benzylpenicillin-resistant Staph. 2. at 12.5 mcg./ml.

*Example 25.—Tri-n-propylmethylpenicillin*

6-aminopenicillanic acid (3.89 g.) was acylated with tripropylacetyl chloride (3.68 g.) according to the method of Example 24 to give the sodium salt of tri-n-propylmethylpenicillin (5.98 g.).

It inhibited Staph. Oxford at a concentration of 0.05 mcg./ml., the benzylpenicillin-resistant Stap. 1. at 1.25 mcg./ml., and the benzylpenicillin-resistant Staph. 2. at 0.6 mcg./ml.

*Example 26.—Tri-n-butylmethylpenicillin*

6-aminopenicillanic acid (432 mg.) was acylated with tri-n-butylacetylchloride (493 mg.) according to the method of Example 24 to give the sodium salt of tri-n-butylmethylpenicillin as a colorless deliquescent solid (628 mg.).

It inhibited Staph. aureus at a concentration of 0.6 mcg./ml., Staph. 1. at 2.5 mcg./ml., and Staph. 2. at 2.5 mcg./ml.

*Example 27*

In the procedure of Example 24 the triethylacetyl chloride is replaced by an equimolar weight of the acid chloride of α,α-dimethyl-α-cyclohexylacetic acid,
α-methyl-α-ethyl-α-cycloheptylacetic acid,
α-n-propyl-α,α-dicyclohexylacetic acid,
α,α-di-n-propyl-α-cyclopentylacetic acid,
α,α-di-n-hexyl-α-cyclobutylacetic acid
α-n-hexyl-α-n-decyl-n-octanoic acid,
α,α-diisoamyl-isovaleric acid,
α,α,α-tricyclohexylacetic acid,
α-methyl-α-n-propyl-n-decanoic acid,
α,α-di-isopropyl-α-cyclohexylacetic acid,
α,α-di-n-butyl-α-cycloheptylacetic acid,
α,α-n-decyl-n-octanoic acid and α-methyl-α,α-dicyclohexylacetic acid, respectively, to form the acids 6-[α,α-dimethyl-α-cyclohexylacetamido]penicillanic acid,
6-[α-methyl-α-ethyl-α-cycloheptylacetamido]penicillanic acid,
6-[α-n-propyl-α,α-dicyclohexylacetamido]penicillanic acid,
6-[α,α-di-n-propyl-α-cyclopentylacetamido]penicillanic acid,
6-[α,α-di-n-hexyl-α-cyclobutylacetamido]penicillanic acid,
6-[α-n-hexyl-α-n-decyl-n-octanoamido]penicillanic acid,
6-[α,α-diisoamyl-isovaleramido]penicillanic acid,
6-[α,α,α-tricyclohexylacetamido]penicillanic acid,
6-[α-methyl-α-n-propyl-n-decanoamido]penicillanic acid,
6-[α,α-di-isopropyl-α-cyclohexylacetamido]penicillanic acid,
6-[α,α-di-n-butyl-α-cycloheptylacetamido]penicillanic acid,
6-[α,α-n-decyl-n-octanoamido]penicillanic acid, and
6-[α-methyl-α,α-dicyclohexylacetamido]penicillanic acid, respectively, which are isolated as their solid, water-soluble sodium salts and found to inhibit Staph. aureus Smith at concentrations of 0.001 percent.

(e) DIARYL (SUBSTITUTED OXY) TYPE

*Example 28.—α-Methoxydiphenylmethylpenicillin*

A solution of α-methoxydiphenylacetyl chloride (1.04 g.) in dry chloroform (5 ml.) was added dropwise to a stirred mixture of 6-aminopenicillanic acid (0.43 g.), chloroform (12 ml.), and triethylamine (0.84 ml.). Stirring was continued for 2 hours and the mixture was then filtered from a little undissolved solid. The filtrate was treated with successive small portions of 0.2 N hydrochloric acid, with vigorous shaking between additions, until the aqueous phase was at pH 2–3. The acid layer was separated and discarded, and the chloroform solution was washed with water (20 ml.). Enough 3% aqueous sodium bicarbonate solution was added to the chloroform solution to give, after vigorous shaking a neutral emulsion (pH 7). This was evaporated at low temperature and pressure and the residual pale yellow solid was dried in a vacuum desiccator. There was obtained 0.90 g. of the sodium salt of α-methoxydiphenylmethylpenicillin.

The product inhibited Staph. aureus at a concentration of 0.01 mcg./ml., the benzylpenicillin-resistant Staph. 1. at 5 mcg./ml., and the benzylpenicillin-resistant Staph. 2. at 5 mcg./ml.

The α-methoxydiphenylacetyl chloride was prepared as a crude oil by warming α-methoxydiphenylacetic acid with thionyl chloride in benzene, followed by removal of solvent and excess reagent in vacuo.

*Example 29.—α-Ethoxydiphenylmethylpenicillin*

6-aminopenicillanic acid (2.6 g.) was acylated with α-ethoxydiphenylacetyl chloride (3.3 g.) as described in Example 28 to give the sodium salt of α-ethoxydiphenylmethylpenicillin (2.8 g.).

It inhibited Staph. aureus at a concentration of 2.5 mcg./ml., Staph. 1. at 12.5 mcg./ml., and Staph. 2. at 12.5 mcg./ml.

The α-ethoxydiphenylacetyl chloride was prepared as a crude oil by warming α-ethoxydiphenylacetic acid with thionyl chloride in benzene, followed by removal of solvent and excess reagent in vacuo.

*Example 30.—α-Isopropoxydiphenylmethylpenicillin*

A solution of α-isopropoxydiphenylacetyl chloride (4.6 g.) in dry acetone (20 ml.) was added dropwise to a stirred solution of 6-aminopenicillanic acid (3.5 g.) and sodium bicarbonate (4 g.) in water (48 ml.) and acetone (28 ml.). When addition was complete the mixture was stirred at room temperature for 2 hours, then diluted with water (60 ml.) and extracted with ether (100 ml. in 3 portions), only the aqueous phase being retained. This aqueous solution was covered with ether (30 ml.) and adjusted to pH 2 by the addition of N hydrochloride acid. After separating the layers, the aqueous phase was extracted with two 15 ml. portions of ether. The combined ether solutions (which at this stage contained the free penicillin acid) were washed with water (50 ml.) and then shaken with sufficient 8% sodium bicarbonate solution to give a neutral aqueous phase (pH 7). The layers were separated and the ether phase was extracted with two 5 ml. portions of water to each of which was added enough bicarbonate solution to produce an aqueous phase of pH 7. The combined aqueous solutions were washed with ether (15 ml.) and evaporated at low temperature and pressure to leave the sodium salt of α-isopropoxydiphenylmethylpenicillin as a white solid, which was finally dried in a vacuum desiccator. Yield 2.66 g.

It inhibited Staph. Oxford at a concentration of 0.6 mcg./ml., Staph. 1. at 12.5 mcg./ml., and Staph. 2. at 12.5 mcg./ml.

The α-isopropoxydiphenylacetyl chloride was prepared as a crude oil by warming α-isopropoxydiphenylacetic acid with thionyl chloride in benzene, followed by removal of solvent and excess reagent in vacuo.

*Example 31.—α-Butoxydiphenylmethylpenicillin*

6-aminopenicillanic acid (0.43 g.) was acylated with α-butoxydiphenylacetyl chloride (1 g.) as described in Example 28 to give the sodium salt of α-butoxydiphenylmethylpenicillin (1.2 g.).

It inhibited *Staph. aureus* at a concentration of 1.25 mcg./ml., Staph. 1. at 2.5 mcg./ml., and Staph. 2. at 2.5 mcg./ml.

The α-butoxydiphenylacetyl chloride was prepared as a crude oil by warming α-butoxydiphenylacetic acid with thionyl chloride in benzene, followed by removal of solvent and excess reagent in vacuo.

*Example 32*

In the procedure of Example 28 the α-methoxydiphenylacetyl chloride is replaced by an equimolar weight of the acid chloride of α-(4-nitrophenyl)-α-phenyl-α-cyclohexyloxyacetic acid,
α-(4-bromophenyl)-α-(4-hydroxyphenyl)-α-cyclopentoxyacetic acid,
α-(4-t-butylphenyl)-α-(4-methoxyphenyl)-α-cyclobutoxyacetic acid,
α-(4-trifluoromethylphenyl)-α-(4-methylphenyl)-α-methoxyacetic acid,
α-(3-aminophenyl)-α-(2-hydroxyphenyl)-α-cycloheptoxyacetic acid,
α-(4-sulfamylphenyl)-α-(2-methoxyphenyl)-α-ethoxyacetic acid,
α-(2-benzylphenyl)-α-(2-methylphenyl)-α-n-propoxyacetic acid,
α-(3-methoxyphenyl)-α-phenyl-α-n-hexoxyacetic acid,
α-(2-iodophenyl)-α-(3-hydroxyphenyl)-α-n-decoxyacetic acid,
α-(3-diethylaminophenyl)-α-(3-methoxyphenyl)-α-isopropoxyacetic acid,
α-(4-cyclohexylphenyl)-α-(3-methylphenyl)-α-n-hexoxyacetic acid,
α,α-di-(4-methylaminophenyl)-α-isopropoxyacetic acid,
α-(4-chlorophenyl)-α-(4-hydroxyphenyl)-α-methoxyacetic acid,
α-(2-acetamidophenyl)-α-(3-hydroxyphenyl)-α-ethoxyacetic acid,
α-(3,4-dimethylphenyl)-α-(2-hydroxyphenyl)-α-methoxyacetic acid,
α,α-di-(3,4-dichlorophenyl)-α-cyclohexoxyacetic acid,
α,α-di-(3,4,5-trimethoxyphenyl)-α-cyclopentoxyacetic acid,
α,α-di-(4-hydroxyphenyl)-α-methoxyacetic acid,
α,α-di-(3,4-dihydroxyphenyl)-α-ethoxyacetic acid,
α,α-di-(4-methylthiophenyl)-α-methoxyacetic acid,
α,α-di-(4-methylsulfonylphenyl)-α-ethoxyacetic acid, and
α,α-di-(2,5-dimethyl-4-hydroxyphenyl)-α-methoxyacetic acid, respectively, to produce the acids 6-[α-(4-nitrophenyl)-α-phenyl-α-cyclohexyloxyacetamido]penicillanic acid,
6-[α-(4-bromophenyl)-α-(4-hydroxyphenyl)-α-cyclopentoxyacetamido]penicillanic acid,
6-[α-(4-t-butylphenyl)-α-(4-methoxyphenyl)-α-cyclobutoxyacetamido]penicillanic acid,
6-[α-(4-trifluoromethylphenyl)-α-(4-methylphenyl)-α-methoxyacetamido]penicillanic acid,
6-[α-(3-aminophenyl)-α-(2-hydroxyphenyl)-α-cycloheptoxyaceamido]penicillanic acid,
6-[α-(4-sulfamylphenyl)-α-(2-methoxyphenyl)-α-ethoxyacetamido]penicillanic acid,
6-[α-(2-benzylphenyl)-α-(2-methylphenyl)-α-n-propoxyacetamido]penicillanic acid,
6-[α-(3-methoxyphenyl)-α-phenyl-α-n-hexoxyacetamido]penicillanic acid,
6-[α-(2-iodophenyl)-α-(3-hydroxyphenyl)-α-n-decoxyacetamido]penicillanic acid,
6-[α-(3-diethylaminophenyl)-α-(3-methoxyphenyl)-α-isopropoxyacetamido]penicillanic acid,
6-[α-(4-cyclohexylphenyl)-α-(3-methylphenyl)-α-n-hexoxyacetamido]penicillanic acid,
6-[α,α-di-(4-methylaminophenyl)-α-ispropoxyacetamido]penicillanic acid,
6-[α-(4-chlorophenyl)-α-(4-hydroxyphenyl)-α-methoxyacetamido]penicillanic acid,
6-[α-(2-acetamidophenyl)-α-(3-hydroxyphenyl)-α-ethoxyacetamido]penicillanic acid,
6-[α-(3,4-dimethylphenyl)-α-(2-hydroxyphenyl)-α-methoxyacetamido]penicillanic acid,
6-[α,α-di-(3,4-dichlorophenyl)-α-cyclohexoxyacetamido]penicillanic acid,
6-[α,α-di-(3,4,5-trimethoxyphenyl)-α-cyclopentoxyacetamido]penicillanic acid,
6-[α,α-di-(4-hydroxyphenyl)-α-methoxyacetamido]penicillanic acid,
6-[α,α-di-(3,4-dihydroxyphenyl)-α-ethoxyacetamido]penicillanic acid,
6-[α,α-di-(4-methylthiophenyl)-α-methoxyacetamido]penicillanic acid,
6-[α,α-di-(4-methylsulfonylphenyl)-α-ethoxyacetamido]penicillanic acid,
6-[α,α-di-(2,5-dimethyl-4-hydroxyphenyl)-α-methoxyacetamide]penicillanic acid, respectively,
which are isolated as their solid, water-soluble sodium salts and found to inhibit *Staph. aureus* Smith at concentrations of 0.001 percent by weight.

(f) DIARYL (SUBSTITUTED THIO) TYPE

*Example 33.—α-Ethylthiodiphenylmethylpenicillin*

A solution of α-ethylthiodiphenylacetyl chloride (8.0 g.) in dry acetone (30 ml.) was added dropwise during 10 mins. to a stirred solution of 6-aminopencillanic acid (5.4 g.) and sodium bicarbonate (6.3 g.) in water (90 ml.) and acetone (60 ml.). When addition was complete the mixture was stirred at room temperature for 2½ hrs., then diluted with water (50 ml.) and extracted with ether (2 x 100 ml.), only the aqueous phase being retained. This aqueous solution was covered with ether (50 ml.) and adjusted to pH 2 by the addition of N hydrochloric acid. After separating the layers, the aqueous phase was extracted with two further 25 ml. portions of ether. The combined ether solutions (which at this stage contained the free penicillin acid) were washed with water (50 ml.) and then shaken with sufficient 8% sodium bicarbonate solution to give a neutral aqueous phase (pH 7). The layers were separated and the ether phase was extracted with two 5 ml. portions of water to each of which was added sufficient bicarbonate solution to produce on aqueous phase of pH 7. The combined aqueous extracts were washed with ether (25 ml.) and then evaporated at low temperature and pressure to leave the sodium salt of α-ethylthiodiphenylmethylpenicillin as a pale yellow solid which was finally dried in a vacuum desiccator. Yield 8.67 g.

The product inhibited Staph. Oxford at a concentration of 0.025 mcg./ml., the benzylpenicillin-resistant Staph. 1. at 1.25 mcg./ml., and the benzylpenicillin-resistant Staph. 2. at 2.5 mcg./ml.

The α-ethylthiodiphenylacetyl chloride was prepared as a crude oil by warming the corresponding acid with thionyl chloride in benzene, then removing the solvent and excess reagent in vacuo. α-Ethylthiodiphenylacetic acid, M.P. 131–132° C., was itself prepared by condensing

Example 34.—α-n-Propylthiodiphenylmethylpenicillin 6-aminopenicillanic acid (6.25 g.) was acylated with α-n-propylthiodiphenylacetyl chloride (8.8 g.) according to the procedure described in Example 33 to give the sodium salt of α-n-propylthiodiphenylmethylpenicillin as a white powder (8.36 g.).

It inhibited Staph. Oxford at a concentration of 0.6 mcg./ml., Staph. 1. at 2.5 mcg./ml., and Staph. 2. at 1.25 mcg./ml.

The α-n-propylthiodiphenylacetyl chloride was prepared as a crude oil by warming the corresponding acid with thionyl chloride in benzene, then removing the solvent and excess reagent in vacuo. α-n-Propylthiodiphenylacetic acid, M.P. 116–118° C., was itself prepared by condensing benzilic acid with n-propylmercaptan according to the general method of Barkenbus and Brower (J. Amer. Chem. Soc., 77, 579, 1955).

Example 35.—α-n-Butylthiodiphenylmethylpenicillin

A solution of α-n-butylthiodiphenylacetyl chloride (0.64 g.) in dry chloroform (6 ml.) was added dropwise to a stirred mixture of 6-aminopenicillanic acid (0.43 g.), chloroform (12 ml.), and triethylamine (0.84 ml.). The mixture was stirred at room temperature for 2½ hours and then filtered. The filtrate was treated with successive small portions of 0.2 N hydrochloric acid, with vigorous shaking between additions, until the aqueous phase was at pH 2. The acid layer was separated and discarded, and the chloroform solution was washed with water (15 ml.). Sufficient 3% aqueous sodium bicarbonate solution was added to the chloroform solution to give, after vigorous shaking, a neutral emulsion (pH 7). This was evaporated at low temperature and pressure and the residual white solid dried in a vacuum desiccator. There was obtained 0.62 g. of the sodium salt of α-n-butylthiodiphenylmethylpenicillin.

It inhibited *Staph. aureus* at a concentration of 1.25 mcg./ml., Staph. 1. at 2.5 mcg./ml., and Staph. 2. at 2.5 mcg./ml.

The α-n-butylthiodiphenylacetyl chloride was prepared as a crude oil by warming the corresponding acid, itself prepared by the method of Barkenbus and Brower (J. Amer. Chem. Soc., 77, 579, 1955), with thionyl chloride in benzene, then removing the solvent and excess reagent in vacuo.

Example 36.—α-Isopropylthiodiphenylmethylpenicillin 6-aminopenicillanic acid (6.5 g.) was acylated with α-isopropylthiodiphenylacetyl chloride (10.4 g.) according to the procedure described in Example 33 to give the sodium salt of α-isopropylthiodiphenylmethylpenicillin as a white solid (9.65 g.).

It inhibited Staph. Oxford at a concentration of 0.6 mcg./ml., Staph. 1. at 5 mcg./ml., and Staph. 2. at 5 mcg./ml.

The α-isopropylthiodiphenylacetyl chloride was prepared as a crude oil by warming the corresponding acid with thionyl chloride in benzene, then removing the solvent and excess reagent in vacuo. α-Isopropylthiodiphenylacetic acid, M.P. 130–132° C., was itself prepared by condensing benzilic acid with isopropyl mercaptan according to the general method of Barkenbus and Brower (J. Amer. Chem. Soc., 77, 579, 1955).

Example 37.—α-Sec-butylthiodiphenylmethylpenicillin 6-aminopenicillanic acid (5.4 g.) was acylated with α-sec-butylthiodiphenylacetyl chloride (9.6 g.) according to the procedure described in Example 33 to give the sodium salt of α-sec-butylthiodiphenylmethylpenicillin as a pale yellow solid (7.87 g.).

It inhibited Staph. Oxford at a concentration of 0.6 mcg./ml., Staph. 1. at 5 mcg./ml., and Staph. 2. at 5 mcg./ml.

The α-sec-butylthiodiphenylacetyl chloride was prepared as a crude oil by warming the corresponding acid with thionyl chloride in benzene, then removing the solvent and excess reagent in vacuo. α-sec-butylthiodiphenylacetic acid, M.P. 95–97° C., was itself prepared by condensing benzilic acid with sec-butylmercaptan according to the general method of Barkenbus and Brower (J. Amer. Chem. Soc., 77, 1955, 579).

Example 38.—α-Benzylthiodiphenylmethylpenicillin 6-aminopenicillanic acid (4.95 g.) was acylated with α-benzylthiodiphenylacetyl chloride (8.85 g.) according to the procedure described in Example 33 to give the sodium salt of α-benzylthiodiphenylmethylpenicillin (7.53 g.).

It inhibited Staph. Oxford at a concentration of 0.125 mcg./ml., Staph. 1. at 0.5 mcg./ml., and Staph. 2. at 0.6 mcg./ml.

The α-benzylthiodiphenylacetyl chloride was prepared as a crude oil by warming the corresponding acid, itself prepared by the method of Barkenbus and Brower (J. Amer. Chem. Soc., 1955, 77, 579), with thionyl chloride in benzene, then removing the solvent and excess reagent in vacuo.

Example 39

In the procedure of Example 33 the α-ethylthiodiphenylacetyl chloride is replaced by an equimolar weight of the acid chloride of α-(4-nitrophenyl)-α-phenyl-α-cyclohexylthioacetic acid,
α-(4-bromophenyl)-α-(4-hydroxyphenyl)-α-cyclopentylthioacetic acid,
α-(4-t-butylphenyl)-α-(4-methoxyphenyl)-α-cyclobutylthioacetic acid,
α-(4-trifluoromethylphenyl)-α-(4-methylphenyl)-α-methylthioacetic acid,
α-(3-aminophenyl)-α-(2-hydroxyphenyl)-α-cycloheptylthioacetic acid,
α-(4-sulfamylphenyl)-α-(2-methoxyphenyl)-α-ethylthioacetic acid,
α-(2-benzylphenyl)-α-(2-methylphenyl)-α-n-propylthioacetic acid,
α-(3-methoxyphenyl)-α-phenyl-α-n-hexylthioacetic acid,
α-(2-iodophenyl)-α-(3-hydroxyphenyl)-α-n-decylthioacetic acid,
α-(3-diethylaminophenyl)-α-(3-methoxyphenyl)-α-isopropylthioacetic acid,
α-(4-cyclohexylphenyl)-α-(3-methylphenyl)-α-n-hexylthioacetic acid,
α,α-di-(4-methylaminophenyl)-α-isopropylthioacetic acid,
α-(4-chlorophenyl)-α-(4-hydroxyphenyl)-α-methylthioacetic acid,
α-(2-acetamidophenyl)-α-(3-hydroxyphenyl)-α-ethylthioacetic acid,
α-(3,4-dimethylphenyl)-α-(2-hydroxyphenyl)-α-methylthioacetic acid, α,α-di-(3,4-dichlorophenyl)-α-cyclohexylthioacetic acid,
α,α-di-(3,4,5-trimethoxyphenyl)-α-cyclopentylthioacetic acid,
α,α-di-(4-hydroxyphenyl)-α-methylthioacetic acid,
α,α-di-(3,4-dihydroxyphenyl)-α-ethylthioacetic acid,
α,α-di-(4-methylthiophenyl)-α-methylthioacetic acid,
α,α-di-(4-methylsulfonylphenyl)-α-ethylthioacetic acid, and
α,α-di-(2,5-dimethyl-4-hydroxyphenyl)-α-methylthioacetic acid, respectively to produce the acids 6-[α-(4-nitrophenyl)-α-phenyl-α-cyclohexylthioacetamido]penicillanic acid,
6-[α-(4-bromophenyl)-α-(4-hydroxyphenyl)-α-cyclopentylthioacetamido]penicillanic acid,
6-[α-(4-t-butylphenyl)-α-(4-methoxyphenyl)-α-cyclobutylthioacetamido]penicillanic acid,
6-[α-(4-trifluoromethylphenyl)-α-(4-methylphenyl)-α-methylthioacetamido]penicillanic acid, 6-[α-(3-aminophenyl)-α-(2-hydroxyphenyl)-α-cycloheptylthioacetamido]penicillanic acid,
6-[α-(4-sulfamylphenyl)-α-(2-methoxyphenyl)-α-ethylthioacetamido]penicillanic acid,
6-[α-(2-benzylphenyl)-α-(2-methylphenyl)-α-n-propylthioacetamido]penicillanic acid,
6-[α-(3-methoxyphenyl)-α-phenyl-α-n-hexylthioacetamido]penicillanic acid,
6-[α-(2-iodophenyl)-α-(3-hydroxyphenyl)-α-n-decylthioacetamido]penicillanic acid,
6-[α-(3-diethylaminophenyl)-α-(3-methoxyphenyl)-α-isopropylthioacetamido]penicillanic acid,
6-[α-(4-cyclohexylphenyl)-α-(3-methylphenyl)-α-n-hexylthioacetamido]penicillanic acid,
6-[α,α-di-(4-methylaminophenyl)-α-isopropylthioacetamido]penicillanic acid,
6-[α-4-chlorophenyl)-α-(4-hydroxyphenyl)-α-methylthioacetamido]penicillanic acid,
6-[α-(2-acetamidophenyl)-α-(3-hydroxyphenyl)-α-ethylthioacetamido]penicillanic acid,
6-[α-(3,4-dimethylphenyl)-α-(2-hydroxyphenyl)-α-methylthioacetamido]penicillanic acid,
6-[α,α-di-(3,4-dichlorophenyl)-α-cyclohexylthioacetamido]penicillanic acid,
6-[α,α-di-(3,4,5-trimethoxyphenyl)-α-cyclopentylthioacetamido]penicillanic acid,
6-[α,α-di-(4-hydroxyphenyl)-α-methylthioacetamido]penicillanic acid,
6-[α,α-di-(3,4-dihydroxyphenyl)-α-ethylthioacetamido]penicillanic acid,
6-[α,α-di-(4-methylthiophenyl)-α-methylthioacetamido]penicillanic acid,
6-[α,α-di-(4-methylsulfonylphenyl)-α-ethylthioacetamido]penicillanic acid, and
6-[α,α-di-(2,5-dimethyl-4-hydroxyphenyl)-α-methylthioacetamido]penicillanic acid, respectively, which are isolated as their solid, water-soluble sodium salts and found to inhibit *Staph. aureus* Smith at concentrations of 0.001 percent by weight.

*Example 40.*—α-*Phenylthiodiphenylmethylpenicillin*

6-aminopenicillanic acid (0.22 g.) was acylated with α-phenylthiodiphenylacetyl chloride (0.34 g.) according to the procedure described in Example 35 to give the sodium salt of α-phenylthiodiphenylmethylpenicillin (0.34 g.).

It inhibited *Staph. aureus* at a concentration of 0.5 mcg./ml., Staph 1. at 1.25 mcg./ml., and Staph 2. at 1.25 mcg./ml.

The α-phenylthiodiphenylacetyl chloride, M.P. 67–69° C., was prepared by heating the corresponding acid in benzene with thionyl chloride and a trace of pyridine, removing the solvent and excess reagent in vacuo, and crystallizing the residue from light petroleum.

*Example 41.*—α-*p-Tolylthiodiphenylmethylpenicillin*

6-aminopenicillanic acid (4.1 g.) was acylated with α-p-tolylthiodiphenylacetyl chloride (8.2 g.) according to the procedure described in Example 33 to give the sodium salt of α-p-tolylthiodiphenylmethylpenicillin (7.5 g.).

It inhibited Staph. Oxford at a concentration of 0.6 mcg./ml., Staph. 1. at 1.25 mcg./ml., and Staph. 2. at 1.25 mcg./ml.

Slightly impure α-p-tolylthiodiphenylacetyl chloride was prepared by heating the corresponding acid in benzene with thionyl chloride and a little pyridine. After removing the solvent and excess reagent in vacuo the residual oil was scratched to induce crystallization and the resulting colorless solid, M.P. 70–74° C., was used without further purification.

*Example 42*

In the procedure of Example 40, the α- phenylthiodiphenylacetyl chloride is replaced by an equimolar weight of the acid chloride of α-(4-nitrophenyl)-α-phenyl-α-(4-methoxylphenylthio)acetic acid,
α-(4-bromophenyl)-α-(4-hydroxyphenyl)-α-phenylthioacetic acid,
α-(4-t-butylphenyl)-α-(4-methoxyphenyl)-α-(4-methylphenylthio)acetic acid,
α-(4-trifluoromethylphenyl)-α-(4-methylphenyl)-α-phenylthioacetic acid,
α-(3-aminophenyl)-α-(2-hydroxyphenyl)-α-(4-hydroxyphenylthio)acetic acid,
α-(4-sulfamylphenyl)-α-(2-methoxyphenyl)-α-phenylthioacetic acid,
α-(2-benzylphenyl)-α-(2-methylphenyl)-α-phenylthioacetic acid,
α-(3-methoxyphenyl)-α-phenyl-α-(2-methoxyphenylthio)acetic acid,
α-(2-iodophenyl)-α-(3-hydroxyphenyl)-α-(2-hydroxyphenylthio)acetic acid,
α-(3-diethylaminophenyl)-α-(3-methoxyphenyl)-α-(2-methylphenylthio)acetic acid,
α-(4-cyclohexylphenyl)-α-(3-methylphenyl)-α-(3-methylphenylthio)acetic acid.
α,α-di-(4-methylaminophenyl)-α-(3-hydroxyphenylthio)acetic acid,
α-(4-chlorophenyl)-α-(4-hydroxyphenyl)-α-phenylthioacetic acid,
α-(2-acetamidophenyl)-α-(3-hydroxyphenyl)-α-phenylthioacetic acid,
α-(3,4-dimethylphenyl)-α-(2-hydroxyphenyl)-α-phenylthioacetic acid,
α,α-di-(3,4-dichlorophenyl)-α-(3-methoxyphenylthio)acetic acid,
α,α-di-(3,4,5-trimethoxyphenyl)-α-phenylthioacetic acid,
α,α-di-(4-hydroxyphenyl)-α-phenylthioacetic acid,
α,α-di-(3,4-dihydroxyphenyl)-α-phenylthioacetic acid,
α,α-di-(4-methylthiophenyl)-α-phenylthioacetic acid,
α,α-di-(4-methylsulfonylphenyl)-α-phenylthioacetic acid, and
α,α-di-(2,5-dimethyl-4-hydroxyphenyl)-α-phenylthioacetic acid, respectively, to produce the acids 6-[α-(4-nitrophenyl)-α-phenyl-α-(4-methoxyphenylthio)acetamido]penicillanic acid,
6-[α-(4-bromophenyl)-α-(4-hydroxyphenyl)-α-phenylthioacetamido]penicillanic acid,
6-[α-(4-t-butylphenyl)-α-(4-methoxyphenyl)-α-(4-methylphenylthio)acetamido]penicillanic acid,
6-[α-(4-trifluoromethylphenyl)-α-(4-methylphenyl)-α-phenylthioacetamido]penicillanic acid,
6-[α-(3-aminophenyl)-α-(2-hydroxyphenyl)-α-(4-hydroxyphenylthio)acetamido]penicillanic acid,
6-[α-(4-sulfamylphenyl)-α-(2-methoxyphenyl)-α-phenylthioacetamido]penicillanic acid,
6-[α-(2-benzylphenyl)-α-(2-methylphenyl)-α-phenylthioacetamido]penicillanic acid,
6-[α-(3-methoxyphenyl)-α-phenyl-α-(2-methoxyphenylthio)acetamido] penicillanic acid,
6-[α-(2-iodophenyl)-α-(3-hydroxyphenyl)-α-(2-hydroxyphenylthio)acetamido]penicillanic acid,
6-[α-(3-diethylaminophenyl)-α-(3-methoxyphenyl)-α-(2-methylphenylthio)acetamido]penicillanic acid,
6-[α-(4-cyclohexylphenyl)-α-(3-methylphenyl)-α-(3-methylphenylthio)acetamido]-penicillanic acid,
6-[α,α-di-(4-methylaminophenyl)-α-(3-hydroxyphenylthio)acetamido]penicillanic acid,
6-[α-(4-chlorophenyl)-α-(4-hydroxyphenyl)-α-phenylthioacetamido]penicillanic acid,
6-[α-(2-acetamidophenyl)-α-(3-hydroxyphenyl)-α-phenylthioacetamido]penicillanic acid,
6-[α-(3,4-dimethylphenyl)-α-(2-hydroxyphenyl)-α-phenylthioacetamido]penicillanic acid,
6-[α,α-di-(3,4-dichlorophenyl)-α-(3-methoxyphenylthio)acetamido]penicillanic acid,
6-[α,α-di-(3,4,5-trimethoxyphenyl)-α-phenylthioacetamido]penicillanic acid, 6-[α,α-di-(4-hydroxyphenyl)-α-phenylthioacetamido]
penicillanic acid,
6-[α,α-di-(3,4-dihydroxyphenyl)-α-phenylthioacetamido]
penicillanic acid,
6-[α,α-di-(4-methylthiophenyl)-α-phenylthioacetamido]
penicillanic acid,
6-[α,α-di-(4-methylsulfonylphenyl)-α-phenylthioacetamido]penicillanic acid and
6-[α,α-di-(2,5-dimethyl-4-hydroxyphenyl)-α-phenylthioacetamido]penicillanic acid,
respectively, which are isolated as their solid, water-soluble sodium salts and found to inhibit *Staph. aureus* Smith at concentrations of 0.001 percent by weight.

(g) DIALKYL (SUBSTITUTED OXY) TYPE

*Example 43.—α-Phenoxyisopropylpenicillin*

A solution of α-phenoxyisobutyryl chloride (5.77 g.) in dry acetone (40 ml.) was added dropwise during 15 mins. to a stirred solution of 6-aminopenicillanic acid (5.63 g.) and sodium bicarbonate (6.6 g.) in water (90 ml.) and acetone (50 ml.). When addition was complete the mixture was stirred at room temperature for 2 hours then diluted with water (50 ml.) and washed with two 90 ml. portions of ether. The aqueous phase was brought to pH 2 by addition of N hydrochloric (57 ml.) and the liberated penicillin-free acid was extracted into ether (3 x 25 ml.). These ether extracts were washed with water (2 x 20 ml.) and then shaken with sufficient 8% sodium bicarbonate solution to give a neutral aqueous phase (pH 7). The layers were separated and the ether phase was extracted with two 5 ml. portions of water to each of which was added sufficient bicarbonate solution to produce an aqueous phase of pH 7. Evaporation of the combined aqueous solutions at low temperature and pressure left the sodium salt of 6-(α-phenoxy-α-methylpropionamido)penicillanic acid as a white solid, which was finally dried in a vacuum desiccator. Yield 10.6 g.

The product inhibited Staph. Oxford at 0.005 mcg./ml.

The α-phenoxyisobutyryl chloride was prepared from α-phenoxyisobutyric acid by the method of Gabriel, Ber., 46, 1347 (1913).

*Example 44*

A solution of α-phenoxyisobutyric acid (0.72 g.) and triethylamine (0.55 ml.) in dry acetone (8 ml.) was stirred and cooled to 0° C. A solution of sec. butyl chlorocarbonate (0.51 ml.) in dry acetone (8 ml.) was added dropwise over 5 minutes after which the mixture was stirred at 0-5° C. for 1 hour. A solution of 6-aminopenicillanic acid (0.86 g.) in 0.5 N sodium bicarbonate solution (16 ml.) was added to the suspension, and the resulting clear solution was stirred at room temperature for 2 hours. It was washed then with ether (2 x 15 ml.) and the washings were discarded. The aqueous phase was then acidified to pH 2.5 and 6-(α-phenoxy-α-methylpropionamido)penicillanic acid isolated as in Example 43. The yield of sodium salt was 1.29 g.

*Example 45*

Isobutyl chloroformate (0.1 mol.) was added to a chilled solution of α-phenoxy-isobutyric acid (0.1 mol.) and triethylamine (0.1 mol.) in 250 ml. of acetone and 500 ml. of dioxane and the resulting mixture was stirred for approximately thirty minutes at about 3° C. A chilled solution of 6-aminopenicillanic acid (0.1 mol.) and triethylamine (0.1 mol.) in 500 ml. of water was then added to the above acylating mixture and this reaction mixture was stirred for approximately one hour in the cold. After the addition of a saturated solution of sodium bicarbonate, the alkaline reaction mixture was extracted with ether and the ethereal extract was discarded. After covering the aqueous solution with methyl isobutyl ketone, it was acidified to a pH of about 2 with 6 N hydrochloric acid and was then extracted twice with methyl isobutyl ketone. The combined extracts, in which the product 6-(α-phenoxy-α-methylpropionamido)penicillanic acid was contained, were washed with water, dried over anhydrous sodium sulphate and filtered. The addition of 40 ml. of a 40% butanolic solution of potassium 2-ethylhexanoate caused the precipitation of the potassium salt of the above penicillanic acid. After trituration with ether, this potassium salt was dried in vacuo over phosphorus pentoxide, recovered as a water-soluble powder, and found to weigh 20.8 gms. (0.05 mol.), to melt with decomposition at 232–234° C., to contain the β-lactam structure as shown by infrared analysis and to inhibit *Staph. aureus* Smith at a concentration of 0.4 mcg./ml., and to exhibit versus *Staph. aureus* Smith upon intramuscular injection in mice $CD_{50}$ of 3.7 mgm./kg.

*Example 46*

A solution of α-(2,4-dichlorophenoxy)-α-benzyl-n-butyryl chloride (10.3 g.) in dry acetone (40 ml.) was added dropwise during 15 minutes to a stirred solution of 6-aminopenicillanic acid (5.63 g.) and sodium bicarbonate (6.6 g.) in water (90 ml.) and acetone (50 ml.). When addition was complete, the mixture was stirred at room temperature for 2 hours then diluted with water (50 ml.) and washed with two 90 ml. portions of ether. The aqueous phase was brought to pH 2 by addition of N hydrochloric acid (57 ml.) and the liberated penicillin-free acid was extracted into ether (3 x 25 ml.). These ether extracts were washed with water (2 x 20 ml.) and then shaken with sufficient 8% sodium bicarbonate solution to give a neutral aqueous phase (pH 7). The layers were separated and the ether phase was extracted with two 5 ml. portions of water to each of which was added sufficient bicarbonate solution to produce an aqueous phase of pH 7. Evaporation of the combined aqueous solution at low temperature and pressure left the sodium salt of 6-[α-(2,4-dichlorophenoxy)-α-benzyl-n - butyramido]penicillanic acid as a white solid, which was finally dried in a vacuum desiccator.

The product inhibited *Staph. aureus* Smith at a concentration of 0.001 percent by weight.

*Example 47*

Isobutyl chloroformate (0.1 mol.) was added to a cooled (0°–3° C.) solution of α-(4-hydroxyphenoxy)-α-methyl-isovaleric acid (0.1 mol.) and triethylamine (0.1 mol.) in 250 ml. of acetone and 500 ml. of dioxane and the resulting mixture was stirred for thirty minutes in the cold. This mixture was then treated with a cool solution of 6-aminopenicillanic acid (0.1 mol.) and triethylamine (0.1 mol.) in 500 ml. of water and was stirred in the cold for an additional hour. The pH of the reaction mixture was adjusted to approximately 8 by the addition of a saturated solution of sodium bicarbonate and was then extracted with ether. Following the ether extraction the aqueous solution was covered with methyl isobutyl ketone and was acidified to a pH of 2 by the addition of 6 N HCl. The acidified aqueous solution was then extracted twice with methyl isobutyl ketone. The combined extracts, in which the product 6-[α-(4-hydroxyphenoxy)-α-methyl-iso-valeramido]penicillanic acid was contained, were washed with water, dried over anhydrous sodium sulphate and filtered. The addition of 40 ml. of a 40% butanolic solution of potassium 2-ethylhexanoate caused the precipitation of the potassium salt of the above penicillanic acid. After trituration with ether, this potassium salt was dried in vacuo over phosphorous pentoxide and recovered as a water-soluble powder which inhibited the growth of *Staph. aureus* Smith at a concentration of 0.001 percent by weight.

*Example 48*

After the addition of isobutyl chloroformate (0.1 mol.) to a chilled (4° C.) solution of α-(2,4-dimethoxyphenoxy)-α-methyl-n-valeric acid (0.1 mol.) and triethylamine (0.1 mol.) in 250 ml. of acetone and 500 ml. of dioxane, the reaction mixture was stirred for approximately thirty minutes in the cold. This reaction mixture was then treated with a cool (5° C.) solution of 6-aminopenicillanic acid (0.1 mol.) and triethylamine (0.1 mol.) in 500 ml. of water and stirring was continued for an additional hour. Upon completion of the stirring period, the reaction mixture was made slightly basic (pH=8) by the addition of a saturated sodium bicarbonate solution and was then extracted with ether. The ethereal extract was discarded, the aqueous alkaline solution was covered with methyl isobutyl ketone and was then acidified (pH=2) with 6 N hydrochloric acid. The acidified aqueous solution was extracted twice with methyl isobutyl ketone and these extracts were combined. These combined extracts were washed with water, dried over anhydrous sodium sulphate and filtered. The 6-[α-(2,4-dimethoxyphenoxy)-α-methyl - n - valeramido]-penicillanic acid was precipitated in the form of its potassium salt, by the addition of 40 ml. of a 40% butanolic solution of potassium 2-ethylhexanoate. After trituration with ether, this potassium salt was dried in vacuo over $P_2O_5$ and recovered as a water-soluble powder which inhibited the growth of *Staph. aureus* Smith at a concentration of 0.001 percent by weight.

*Example 49*

A solution of α-phenoxy-α-benzylphenylacetyl chloride (9.7 g.) in dry acetone (40 ml.) was added dropwise during 15 minutes to a stirred solution of 6-aminopenicillanic acid (5.63 g.) and sodium bicarbonate (6.6 g.) in water (90 ml.) and acetone (50 ml.). When addition was complete the mixture was stirred at room temperature for 2 hours then diluted with water (50 ml.) and washed with two 90 ml. portions of ether. The aqueous phase was brought to pH 2 by addition of N hydrochloric acid (57 ml.) and the liberated penicillin-free acid was extracted into ether (3 x 25 ml.). These ether extracts were washed with water (2 x 20 ml.) and then shaken with sufficient 8% sodium bicarbonate solution to give a neutral aqueous phase (pH 7). The layers were separated and the ether phase was extracted with two 5 ml. portions of water to each of which was added sufficient bicarbonate solution to produce an aqueous phase of pH 7. Evaporation of the combined aqueous solutions at low temperature and pressure left the sodium salt of 6-(α-phenoxy-α-benzylphenyl-acetamido)penicillanic acid as a white solid which was finally dried in a vacuum desiccator.

The product inhibited *Staph. aureus* Smith at a concentration of 0.001 percent by weight.

*Example 50*

In the procedure of Examples 43 to 45 the acid was replaced by

α-phenoxy-α-benzylpropionic acid,
α-phenoxy-α-benzylphenylbutyric acid,
α-(4-nitrophenoxy)-α-methyl-n-butyric acid,
α-(4-bromophenoxy)-α-phenyl-n-valeric acid,
α-(4-tertiary butylphenoxy)-α-benzyl-n-butyric acid,
α-(4-trifluoromethylphenoxy)-α-phenyl-n-butyric acid,
α-(3-aminophenoxy)-α-benzyl-n-valeric acid,
α-(4-sulphamylphenoxy)-α-methylpropionic acid,
α-(2-benzylphenoxy)-α-methyl-n-butyric acid,
α-(3-methoxyphenoxy)-α-methyldecanoic acid,
α-(2-iodophenoxy)-α-phenylpropionic acid,
α-(3-diethylaminophenoxy)-α-methyl-n-butyric acid,
α-(4-cyclohexylphenoxy)-α,α-dimethylacetic acid,
α-(3-aminophenoxy)-α-methylpropionic acid,
α-(2,3,4,5,6-pentachlorophenoxy)isobutyric acid, and
α-(2,4-diisoamylphenoxy)-α-methyl-n-butyric acid, respectively, to produce the acids 6-(α-phenoxy-α-benzylpropionamido)penicillanic acid,
6-(α-phenoxy-α-benzylphenylbutyramido)penicillanic acid,
6-[α-(4-nitrophenoxy)-α-methyl-n-butyramido] penicillanic acid,
6-[α-(4-bromophenoxy)-α-phenyl-n-valeramido] penicillanic acid,
6-[α-(4-tertiary-butylphenoxy)-α-benzyl-n-butyramido]penicillanic acid,
6-[α-(4-trifluoromethylphenoxy)-α-phenyl-n-butyramido]penicillanic acid,
6-[α-(3-aminophenoxy)-α-benzyl-n-valeramido] penicillanic acid,
6-[α-(4-sulphamylphenoxy)-α-methylpropionamido] penicillanic acid,
6-[α-(2-benzylphenoxy)-α-methyl-n-butyramido] penicillanic acid,
6-[α-(3-methoxyphenoxy)-α-methyldecanoamido] penicillanic acid,
6-[α-(2-iodophenoxy)-α-phenylpropionamido]penicillanic acid,
6-[α-(3-diethylaminophenoxy)-α-methyl-n-butyramido]- penicillanic acid,
6-[α-(3-cyclohexylphenoxy)-α,α-dimethylacetamido]- penicillanic acid,
6-[α-(3-aminophenoxy)-α-methylpropionamido]- penicillanic acid,
6-[α-2,3,4,5,6-pentachlorophenoxy)isobutyramido]- penicillanic acid and
6-[α-(2,4-di-isoamylphenoxy)-α-methyl-n-butyramido]- penicillanic, acid, respectively, which were isolated as their solid, water-soluble potassium salts and found to inhibit *Staph. aureus* Smith at a concentration of 0.001 percent by weight.

(h) DIALKYL (SUBSTITUTED THIO) TYPE

*Example 51.—α-Phenylthioisopropylpenicillin*

A solution of α-phenylthioisobutyryl chloride (6.14 g.) in dry acetone (30 ml.) was added dropwise during 10 minutes to a stirred solution of 6-aminopenicillanic acid (5.63 g.) and sodium bicarbonate (6.55 g.) in water (90 ml.) and acetone (60 ml.). When addition was complete the matter was stirred at room temperature for 2 hrs., then extracted with ether (2 x 90 ml.), only the aqueous phase being retained. This aqueous solution was covered with ether (50 ml.) and adjusted to pH 2 by the addition of N hydrochloric acid. After separating the layers, the aqueous phase was extracted with two further 25 ml. portions of ether. The combined ether solutions (which at this stage contained the free penicillin acid) were washed with water (50 ml.) and then shaken with sufficient 8% sodium bicarbonate solution to give a neutral aqueous phase (pH 7). The layers were separated and the ether phase was extracted with two 5 ml. portions of water to each of which was added sufficient bicarbonate solution to produce an aqueous phase of pH 7. The combined aqueous extracts were washed with ether (30 ml.) and then evaporated at low temperature and pressure. The residue was finally dried in a vacuum desiccator to give the sodium salt of α-phenylthioisopropylpenicillin as a white solid (8.7 g.).

The product inhibited Staph. Oxford at a concentration of 0.012 mcg./ml., and the benzylpenicillin-resistant Staph. 1 at 25 mcg./ml., and the benzylpenicillin-resistant Staph. 2 at 12.5 mcg./ml.

*Example 52.—α-Ethyl-α-phenylthiopropylpenicillin*

6-aminopenicillanic acid (6.49 g.) was acylated with α-ethyl-α-phenylthiobutyryl chloride (7.28 g.) according to the procedure of Example 51 to give the sodium salt of α-ethyl-α-phenylthiopropylpenicillin as a buff-colored solid (12.7 g.).

It inhibited Staph. Oxford at a concentration of 0.05 mcg./ml., Staph. 1 at 5 mcg./ml., and Staph. 2 at 2.5 mcg./ml.

α-Ethyl-α-phenylthiobutyryl chloride, B.P. 86° C./0.05 mm., was prepared from the corresponding acid and thionyl chloride. α-Ethyl-α-phenylthiobutyric acid, M.P. 73–74° C., was itself obtained by the action of thiophenol on ethyl α-bromo-α-ethylbutyrate in the presence of aqueous alcoholic sodium hydroxide.

*Example 53.—α-Propyl-α-phenylthiobutylpenicillin*

6-aminopenicillanic acid (4.32 g.) was acylated with α-propyl-α-phenylthiovaleryl chloride (5.41 g.) according to the procedure of Example 51 to give the sodium salt of α-propyl-α-phenylthiobutylpenicillin (8.6 g.).

It inhibited Staph. Oxford at a concentration of 0.5 mcg./ml., Staph. 1 at 5.0 mcg./ml., and Staph. 2 at 1.25 mcg./ml.

α-Propyl-α-phenylthiovaleryl chloride, B.P. 120° C./ 0.1 mm., was prepared from the corresponding acid and thionyl chloride. α-Propyl-α-phenylthiovaleric acid, M.P. 118° C., was itself obtained by the action of thiophenol on ethyl α-bromo-α-propylvalerate in the presence of aqueous alcoholic sodium hydroxide.

Example 54

In the procedure of Example 51 the α-phenylthioisobutyryl chloride is replaced by an equimolar weight of the acid chloride of α-(4-nitrophenylthio)-α-methylpropionic acid,
α-(4-bromophenylthio)-α-ethylpropionic acid,
α-(4-t-butylphenylthio)-α-isohexyl-n-butyric acid,
α-(4-trifluoromethylphenylthio)-α-methyl-isovaleric acid,
α-(3-aminophenylthio)-α-methyl-n-decanoic acid,
α-(4-sulfamylphenylthio)-α-methyl-α-cyclobutylacetic acid,
α-(2-benzylphenylthio)-α-ethyl-α-cyclopentylacetic acid,
α-(3-methoxyphenylthio)-α-isopropyl-α-cyclohexylacetic acid,
α-(2-iodophenylthio)-α-n-butyl-α-cycloheptylacetic acid,
α-(3-diethylaminophenylthio)-α-methyl-n-butyric acid,
α-(4-cyclohexylphenylthio)-α-n-propyl-n-valeric acid,
α-(4-methylaminophenylthio)-α,α-dicyclohexylacetic acid,
α-(4-chlorophenylthio)-α,α-dicyclopentylacetic acid,
α-(2-acetamidophenylthio)-α-ethylpropionic acid.
α-(3,4-dimethylphenylthio)-α-ethyl-n-butyric acid,
α-(3,4-dichlorophenylthio)-α-ethyl-n-valeric acid,
α-(3,4,5-trimethoxyphenylthio)-α-ethyl-n-hexanoic acid,
α-(4-hydroxyphenylthio)-α-ethyl-n-octanoic acid,
α-(3,4-dihydroxyphenylthio)-α-methyl-n-valeric acid,
α-(4-methylthiophenylthio)-α-methylpropionic, acid,
α-(4-methylsulfonylphenylthio)-α-n-hexylpropionic acid
and
α-(2,5-dimethyl-4-hydroxyphenylthio)-α-methylpropionic acid,
respectively, to form the acids
6-[α-(4-nitrophenylthio)-α-methylpropionamido]-penicillanic acid,
6-[α-(4-bromophenylthio)-α-ethylpropionamido]-penicillanic acid,
6-[α-(4-t-butylphenylthio)-α-isohexyl-n-butyramido]-penicillanic acid,
6-[α-(trifluoromethylphenylthio)-α-methylisovaleramido]penicillanic acid,
6-[α-(3-aminophenylthio)-α-methyl-n-decanoamido]-penicillanic acid,
6-[α-(4-sulfamylphenyl)-α-methyl-α-cyclobutylacetamido]penicillanic acid,
6-[α-(2-benzylphenylthio)-α-ethyl-α-cyclopentylacetamido]penicillanic acid,
6-[α-(3-methoxyphenylthio)-α-isopropyl-α-cyclohexylacetamido]penicillanic acid,
6-[α-(2-iodophenylthio)-α-n-butyl-α-cycloheptylacetamido]penicillanic acid,
6-[α-(3-diethylaminophenylthio)-α-methyl-n-butyramido]penicillanic acid,
6-[α-(4-cyclohexylphenylthio)-α-n-propyl-n-valeramido]penicillanic acid,
6-[α-(4-methylaminophenylthio)-α,α-dicyclohexylacetamido]penicillanic acid,
6-[α-(4-chlorophenylthio)-α,α,-dicyclopentylacetamido]-penicillanic acid,
6-[α-(2-acetamidophenylthio)-α-ethylpropionamido]-penicillanic acid,
6-[α-(3,4-dimethylphenylthio)-α-ethyl-n-butyramido]-penicillanic acid,
6-[α-(3,4-dichlorophenylthio)-α-ethyl-n-valeramido]-penicillanic acid,
6-[α-(3,4,5-trimethyloxyphenylthio)-α-ethyl-n-hexanoamido]penicillanic acid,
6-[α(4-hydroxyphenylthio)-α-ethyl-n-octanoamido]penicillanic acid,
6-[α-(3,4-dihydroxyphenylthio)-α-methyl-n-valeramido]-penicillanic acid,
6-[α-(4-methylthiophenylthio)-α-methylpropionamido]-penicillanic acid,
6-[α-(4-methylsulfonylphenylthio)-α-n-hexylpropionamido]penicillanic acid, and
6-[α-(2,5-dimethyl-4-hydroxy-phenylthio)-α-methylpropionamido]penicillanic acid,
respectively, which are isolated as their solid, water-soluble sodium salts and found to inhibit *Staph. aureus* Smith at concentrations of 0.001 percent.

(j)  DIARL HETEROCYCDLIC TYPE

*Example 55.—α,α-Diphenyl-2-thienylmethylpenicillin*

A solution of α-2-thienyldiphenylacetyl chloride (6.3 g.) in dry acetone (40 ml.) was slowly added to a stirred solution of 6-aminopenicillanic acid (4.33 g.) and sodium bicarbonate (5 g.) in water (100 ml.) and acetone (60 ml.). When addition was complete the mixture was stirred at room temperature for 3 hours, and then filtered. The filtrate was extracted with ether (2 x 100 ml.) and the extracts were discarded. The aqueous phase was covered with ether (50 ml.) and adjusted to pH 2 by addition of N hydrochloric acid. After separating the layers, the aqueous phase was extracted with two more 25 ml. portions of ether. The combined ether solutions (which at this stage contained the free penicillin acid) were washed with water (50 ml.) and then shaken with sufficient 8% sodium bicarbonate solution to give a neutral aqueous phase (pH 7). The layers were separated and the ether phase was extracted with two 5 ml. portions of water to each of which was added enough bicarbonate solution to produce an aqueous phase of pH 7. The combined aqueous extracts were washed with ether, then evaporated at low temperature and pressure. Further drying in a vacuum desiccator left the sodium salt of α-2-thienyldiphenylmethylpenicillin as an almost white solid (6.94 g.).

The product inhibited *Staph. aureus* at a concentration of 0.5 mcg./ml., the benzylpenicillin-resistant Staph. 1 at 0.6 mcg./ml., and the benzylpenicillin-resistant Staph. 2 at 0.6 mcg./ml.

α-2-thienyldiphenylacetyl chloride, M.P. 76–79° C., was prepared by heating the corresponding acid in benzene with thionyl-chloride and trace of pyridine.

(k)  1-ARYLCYCLOALKYL TYPE

*Example 56.—1-phenylcyclopentylpenicillin*

A solution of 1-phenylcyclopentane-1-carbonyl chloride (6.0 g.) in dry acetone (30 ml.) was added gradually to a stirred solution of 6-aminopenicillanic acid (5.63 g.) and sodium bicarbonate (6.55 g.) in water (90 ml.) and acetone (60 ml.). When addition was complete the mixture was stirred at room temperature for 2½ hours and then extracted with ether (2 x 90 ml.), only the aqueous phase being retained. This aqueous solution was covered with ether (50 ml.) and adjusted to pH 2 by the addition of N hydrochloric acid. After separating the layers, the aqueous phase was extracted with two 25 ml. portions of ether. The combined ether solutions (which at this stage contained the free penicillin acid) were washed with water (50 ml.) and then shaken with enough 8% sodium bicarbonate solution to give a neutral aqueous phase (pH 7). The layers were separated and the ether phase was extracted with two 5 ml. portions of water to each of which was added sufficient bicarbonate solution to produce an aqueous phase of pH 7. The combined aqueous solutions were washed with ether (15 ml.) and then evaporated at low temperature and pressure. The residue was finally dried in a vacuum desiccator to give the sodium salt of 1-phenylcyclopentylpenicillin as a pale tan hygroscopic solid (9.78 g.).

The product inhibited Staph. Oxford at a concentration of 0.005 mcg./ml., the benzylpenicillin-resistant Staph. 1 at 12.5 mcg./ml., and the benzylpenicillin-resistant Staph. 2 at 12.5 mcg./ml.

*Example 57.—1-phenylcyclohexylpencillin*

6-aminopenicillanic acid (5.63 g.) was acylated with 1-phenylcyclohexane-1-carbonyl chloride (6.4 g.) as described in Example 56 to give the sodium salt of 1-phenylcyclohexylpenicillin as a white solid (7.8 g.).

It inhibited Staph. Oxford at a concentration of 0.05 mcg./ml., Staph. 1 at 5 mcg./ml., and Staph. 2 at 5 mcg./ml.

(*l*) 9-SUBSTITUTED-9-FLUORENYL TYPE

*Example 58.—9-p-methoxyphenyl-9-fluorenylpenicillin*

A solution of 9-p-methoxyphenylfluorene-9-carbonyl chloride (0.67 g.) in dry chloroform (8 ml.) was added dropwise to a stirred mixture of 6-aminopenicillanic acid (0.43 g.), chloroform (12 ml.), and triethylamine (0.84 ml.). Stirring was continued for 2½ hours and the mixture was then filtered. The filtrate was treated with successive small portions of 0.2 N hydrochloric acid, with vigorous shaking between additions, until the aqueous phase was at pH 3. The acid layer was separated and discarded, and the chloroform solution was washed with water (20 ml.). Sufficient 3% aqueous sodium bicarbonate solution was added to the chloroform solution to give, after vigorous shaking, a neutral emulsion (pH 7). This was evaporated at low temperature and pressure and the residual yellow solid dried in a vacuum desiccator. There was obtained 0.83 g., of the sodium salt of 9-p-methoxyphenyl-9-fluorenylpenicillin.

The product inhibited *Staph. aureus* at a concentration of 1.25 mcg./ml., and the benzylpenicillin-resistant Staph. 1 at 2.5 mcg./ml., and the benzylpenicillin-resistant Staph. 2 at 2.5 mcg./ml.

9-p-methoxyphenylfluorene-9-carbonyl chloride, M.P. 169–171° C., was prepared by heating 9-p-methoxyphenylfluorene-9-carboxylic acid in benzene with thionyl chloride and a trace of pyridine.

*Example 59.—9-methoxy-9-fluorenylpenicillin*

9-methoxyfluorene-9-carboxylic acid (3.81 g.), thionyl chloride (1.1 ml.), and pyridine (10 drops) in benzene (15 ml.) were refluxed for 75 minutes then evaporated in vacuo. The residual impure waxy acid chloride was dissolved in dry acetone (20 ml.) and added dropwise to a stirred solution of 6-aminopenicillanic acid (3.42 g.) and sodium bicarbonate (4 g.) in water (48 ml.) and acetone (20 ml.). When addition was complete, the mixture was stirred at room temperature for 3½ hours, then diluted with water (50 ml.) and extracted with ether (2 x 50 ml.), only the aqueous phase being retained. This aqueous solution was covered with ether (50 ml.) and adjusted to pH 2.5–3 by the addition of N hydrochloric acid. After separating the layers, the aqueous phase was extracted with three further 25 ml. portions of ether. The combined ether solutions (which at this stage contained the free penicillin acid) were washed with water and then shaken with sufficient 8% bicarbonate solution to give a neutral aqueous phase (pH 7). The layers were separated and the ether phase was extracted with two 5 ml. portions of water to each of which was added sufficient bicarbonate solution to produce an aqueous phase of pH 7. Evaporation of the combined aqueous solutions at low temperature and pressure left the sodium salt of 9-methoxy-9-fluorenylpenicillin, which was finally dried in a vacuum desiccator. Yield 3.2 g.

The product inhibited Staph. Oxford at a concentration of 0.25 mcg./ml., Staph. 1 at 25 mcg./ml., and Staph. 2 at 12.5 mcg./ml.

*Example 60.—9-thoxy-9-fluorenylpenicillin*

9-ethoxyfluorene-9-carboxylic acid (3.92 g.) was converted to the crude acid chloride, and the latter was used to acylate 6-aminopenicillanic acid (3.42 g.) as described in Example 59. The sodium salt of 9-ethoxy-9-fluorenylpenicillin was obtained as a white solid (5.63 g.).

It inhibited Staph. Oxford at a concentration of 1.25 mcg./ml.

*Example 61*

In the procedure of Example 56 the 1-phenylcyclopentane-1-carbonyl chloride is replaced by an equimolar weight of the acid chloride of 1-(4'-nitrophenyl)-1-cyclohexanecarboxylic acid,
1-(4'-bromophenyl)-1-cyclopentanecarboxylic acid,
1-(4'-t-butylphenyl)-9-fluorenecarboxylic acid,
1-(4'-trifluoromethylphenyl)-1-cyclohexanecarboxylic acid,
1-(3'-aminophenyl)-1-cyclopentanecarboxylic acid,
1-(4'-sulfamylphenyl)-1-(2'-methylcyclohexane)-carboxylic acid,
1-(2'-benzylphenyl)-1-(2'-methylcyclohexane)-carboxylic acid,
1-(3'-methoxyphenyl)-9-fluorenecarboxylic acid,
1-(2'-iodophenyl)-1-cyclohexanecarboxylic acid,
1-(3'-diethylaminophenyl)-1-cyclopentanecarboxylic acid,
1-(4'-cyclohexylphenyl)-9-fluorenecarboxylic acid,
1-(4'-methylaminophenyl)-1-cyclohexanecarboxylic acid,
1-(4'-chlorophenyl)-1-cyclopentanecarboxylic acid,
1-(2'-acetamidophenyl)-9-fluorenecarboxylic acid,
1-(3',4'-dimethylphenyl)-1-cyclohexanecarboxylic acid,
1-(3',4'-dichlorophenyl)-1-cyclopentanecarboxylic acid,
1-(3',4',5'-trimethoxyphenyl)-9-fluorenecarboxylic acid,
1-(4'-hydroxyphenyl)-1-cyclohexanecarboxylic acid,
1-(3',4'-dihydroxyphenyl)-1-cyclopentanecarboxylic acid,
1-(4'-methylthiophenyl)-9-fluorenecarboxylic acid,
1-(4'-methylsulfonylphenyl)-1-cyclohexanecarboxylic acid, and
1-(2',5'-dimethyl-4'-hydroxyphenyl)-1-cyclopentacarboxylic acid, respectively, to produce the acids 6-[1-(4'-nitrophenyl)-1-cyclohexanecarboxamido]-penicillanic acid,
6-[1-4'-bromophenyl)-1-cyclopentanecarboxamido]penicillanic acid,
6-[1-(4'-t-butylphenyl)-9-fluorenecarboxamido]penicillanic acid,
6-[1-(4'-trifluoromethylphenyl)-1-cyclohexanecarboxamido]penicillanic acid,
6-[1-(3'-aminophenyl)-1-cyclopentanecarboxamido]penicillanic acid,
6-[1-(4'-sulfamylphenyl)-1-(2'-methylcyclohexane)carboxamido]peenicillanic acid,
6-[1-(2'-benzylphenyl)-1-(2'-methylcyclohexane)carboxamido]penicillanic acid,
6-[1-(3'-methoxyphenyl)-9-fluorenecarboxamido]penicillanic acid,
6-[1-(2'-iodophenyl)-1-cyclohexanecarboxamido] penicillanic acid,
6-[1-(3'-diethylaminophenyl)-1-cyclopentanecarboxamido]penicillanic acid,
6-[1-(4'-cyclohexylphenyl)-9-fluorenecarboxamido] penicillanic acid,
6-[1-(4'-methylaminophenyl)-1-cyclohexanecarboxamido]penicillanic acid,
6-[1-(4'-chlorophenyl)-1-cyclopentanecarboxamido] penicillanic acid,
6-[1-(2'-acetamidophenyl)-9-fluorenecarboxamido] penicillanic acid,
6-[1-(3',4'-dimethylphenyl)-1-cyclohexanecarboxamido)penicillanic acid, 6-[1-(3',4'-dichlorophenyl)-1-cyclopentanecarboxamido)penicillanic acid, 6-[1-(3',4',5'-trimethoxyphenyl)-9-fluorenecarboxamido]penicillanic acid, 6-[1-(4'-hydroxyphenyl)-1-cyclohexanecarboxamido]penicillanic acid, 6-[1-(3',4'-dihydroxyphenyl)-1-cyclopentanecarboxamido]penicillanic acid, 6-[1-(4'-methylthiophenyl)-9-fluorenecarboxamido]penicillanic acid, 6-[1-(4'-methylsulfonylphenyl)-1-cyclohexanecarboxamido]penicillanic acid, and 6-[1-(2',5'-dimethyl-4'-hydroxyphenyl)-1-cyclopentanecarboxamido]penicillanic acid, respectively, which are isolated as their solid, water-soluble sodium salts and found to inhibit *Staph. aureus* Smith at concentrations of 0.001 percent by weight.

(*m*) OTHER TYPES

*Example 62.—Trichlormethylpenicillin*

6-aminopenicillanic acid (3.0 g.) was treated with trichloroacetyl chloride (2.8 g.) as described in Example 1 to give the sodium salt of trichloromethylpenicillin as a pale yellow hygroscopic solid (1.7 g.). It inhibited *Staph. aureus* at a concentration of 125 mcg./ml.

*Example 63.—α-Chloro-α-cyclohexylbenzylpenicillin*

A solution of α-chloro-α-cyclohexyl-α-phenylacetyl chloride (0.63 g.), in dry chloroform (5 ml.) was added dropwise to a stirred mixture of 6-aminopenicillanic acid (0.43 g.), chloroform (12 ml.), and triethylamine (0.84 ml.). Stirring was continued for 2½ hrs., and the resulting solution was treated with successive small portions of 0.2 N hydrochloric acid, with vigorous shaking between additions, until the aqueous phase was at pH 2–3. The acid layer was separated and described, and the chloroform solution was washed with water (20 ml.). Sufficient 3% aqueous sodium bicarbonate solution was added to the chloroform solution to give, after vigorous shaking, a neutral emulsion (pH 7). This was evaporated at low temperature and pressure and the residual yellow solid dried in a vacuum desiccator. There was obtained 0.84 g. of the sodium salt of α-chloro-α-cyclohexylbenzylpenicillin.

The product inhibited *Staph. aureus* at a concentration of 0.25 mcg./ml., Staph. Oxford at 0.025 mcg./ml., and the benzylpenicillin-resistant Staph. 1 at 12.5 mcg./ml., and the benzylpenicillin-resistant Staph. 2. at 25 mcg./ml.

*Example 64.—α-Bromo-α-ethylpropylpenicillin*

A solution of α-bromo-α-ethylbutyryl bromide (7 g.) in dry acetone (40 ml.) was added dropwise during 5 mins. to a stirred solution of 6-aminopenicillanic acid (5.85 g.) and sodium bicarbonate (6.8 g.) in water (80 ml.) and acetone (40 ml.). When addition was complete the mixture was stirred at room temperature for 3 hrs., then diluted with water (40 ml.), and extracted with ether (2 x 80 ml.,), only the aqueous phase being retained. This aqueous solution was covered with ether (50 ml.) and adjusted to pH 2 by the addition of N hydrochloric acid. After separating the layers, the aqueous phase was extracted with 25 ml. portions of ether. The combined ether solution (which at this stage contained the free penicillin acid) were washed with water (50 ml.) and then shaken with sufficient 8% sodium bicarbonate solution to give a neutral aqueous phase (pH 7). The layers were separated and the ether phase was extracted with two 5 ml. portions of water to each of which was added enough bicarbonate solution to produce an aqueous phase of pH 7. The combined aqueous solutions were washed with ether (15 ml.) and then evaporated at low temperature and pressure to leave the sodium salt of α-bromo-α-ethylpropylpenicillin as a white solid, which was finally dried in a vacuum desiccator. Yield 9.26 g.

The product inhibited Staph. Oxford at a concentration of 0.12 mcg./ml., Staph. 1. at 25 mcg./ml., and Staph. 2. at 12.5 mc./ml.

The compounds of the present invention may be employed in admixture with suitable pharmaceutical carriers in various medicinal dosage forms. The present invention therefore also includes a composition comprising a pharmaceutical carrier and a compound of the general Formula II.

All temperatures herein are given in degrees centigrade.

In summary, there are provided according to the present invention various 6-(α,α,α-tri-substituted-acetamido)penicillanic acids and their nontoxic salts which for ease of understanding may be divided into groups following the pattern used above, as follows:

(*a*) Triaryl type:

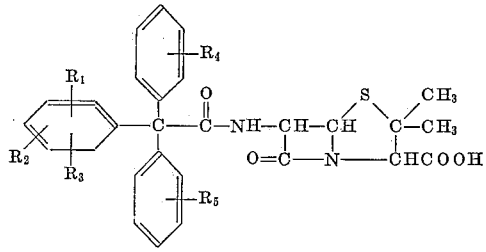

wherein $R_1$, $R_2$ and $R_3$ are each members selected from the group consisting of hydrogen, nitro, amino, (lower)alkylamino, di-(lower)alkylamino, acylamino [where the acylating acid is an aliphatic carboxylic acid containing from one to ten carbon atoms inclusive and the substituent may thus also be named (lower)alkanoylamino], (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ and $R_5$ are each members selected from the group consisting of hydrogen, hydroxy, (lower)alkoxy and (lower)alkyl (including, both here and above, straight and branched chain saturated aliphatic groups having from one to ten carbon atoms inclusive).

(*b*) Diarylalkyl type:

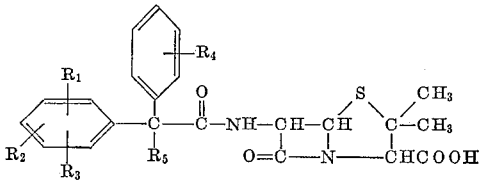

wherein $R_1$, $R_2$ and $R_3$ are each members selected from the group consisting of hydrogen, nitro, amino, (lower)alkylamino, di-(lower)alkylamino, acylamino [where the acylating acid is an aliphatic carboxylic acid containing from one to ten carbon atoms inclusive and the substituent may thus also be named (lower)alkanoylamino], (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ is a member selected from the group consisting of hydrogen, hydroxy, (lower) alkoxy and (lower)alkyl (including both here and above, straight and branched chain saturated aliphatic groups having from one to ten carbon atoms inclusive) and $R_5$ represents a member selected from the group consisting of (lower)alkyl (that is, straight and branched chain saturated aliphatic groups having from one to ten carbon atoms inclusive) and cycloalkyl (e.g., cyclobutyl, cyclopentyl, cyclohexyl and cycloheptyl).

(*c*) Aryldialkyl type:

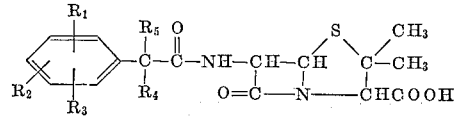

wherein $R_1$, $R_2$ and $R_3$ are each members selected from the group consisting of hydrogen, nitro, amino, (lower)alkylamino, di-(lower)alkylamino, acylamino (where the acylating acid is an aliphatic carboxylic acid containing from one to ten carbon atoms inclusive and the substituent may thus also be named (lower)alkanoylamino), (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ and $R_5$ are each members selected from the group consisting of (lower)alkyl (including straight and branched chain saturated aliphatic groups having from one to ten carbon atoms inclusive) and cycloalkyl (e.g., cyclobutyl, cyclopentyl, cyclohexyl and cycloheptyl).

(d) *Trialkyl type:*

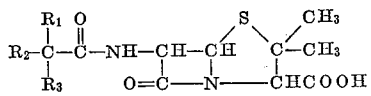

wherein $R_1$, $R_2$ and $R_3$ are each members selected from the group consisting of (lower)alkyl (including straight and branched chain saturated aliphatic groups having from one to ten carbon atoms inclusive) and cycloalkyl (e.g., cyclobutyl, cyclopentyl, cyclohexyl and cycloheptyl).

(e) *Diaryl(substituted oxy) type:*

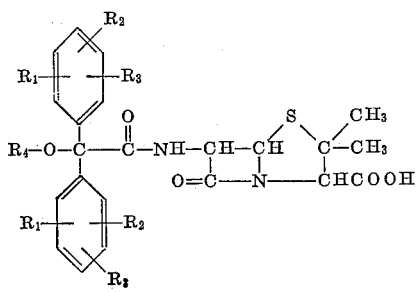

wherein $R_1$, $R_2$ and $R_3$ are each members selected from the group consisting of hydrogen, nitro, amino, (lower)alkylamino, di-(lower)alkylamino, acylamino [where the acylating acid is an aliphatic carboxylic acid containing from one to ten carbon atoms inclusive and the substituent may thus also be named (lower)alkanoylamino], (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ represents a member selected from the group consisting of (lower)alkyl (that is, straight and branched chain saturated aliphatic groups having from one to ten carbon atoms inclusive) and cycloalkyl (e.g., cyclobutyl, cyclopentyl, cyclohexyl and cycloheptyl).

(f) *Diaryl(substituted thio) type:*

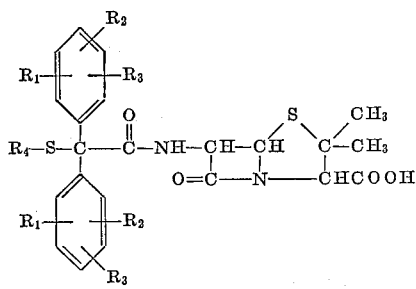

wherein $R_1$, $R_2$ and $R_3$ are each members selected from the group consisting of hydrogen, nitro, amino, (lower)alkylamino, di(lower)alkylamino, acylamino (where the acylating acid is an aliphatic carboxylic acid containing from one to ten carbon atoms inclusive and the substituent may thus also be named (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ represents a member selected from the group consisting of (lower)alkyl (that is, straight and branched chain saturated aliphatic groups having from one to ten carbon atoms inclusive) and cycloalkyl (e.g., cyclobutyl, cyclopentyl, cyclohexyl and cycloheptyl) and aralkyl (e.g., benzyl, β-phenethyl); and

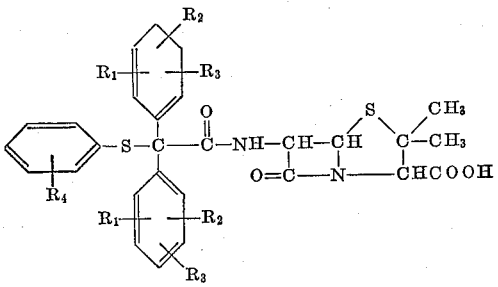

wherein $R_1$, $R_2$ and $R_3$ are each members selected from the group consisting of hydrogen, nitro, amino, (lower)alkylamino, di(lower)alkylamino, acylamino (where the acylating agent is an aliphatic carboxylic acid containing from one to ten carbon atoms inclusive and the substituent may thus also be named (lower)alkanoylamino), (lower)alkyl, fluoro, chloro, bromo, iodo, (lower)alkoxy, hydroxy, (lower)alkylthio, (lower)alkylsulfonyl, sulfamyl, benzyl, cyclopentyl, cyclopentyl and trifluoromethyl and $R_4$ is a member selected from the group consisting of hydrogen, hydroxy, (lower)alkoxy and (lower)alkyl (including, both here and above, straight and branched chain saturated aliphatic groups having from one to ten carbon atoms inclusive).

(g) *Dialkyl(substituted oxy) type:*

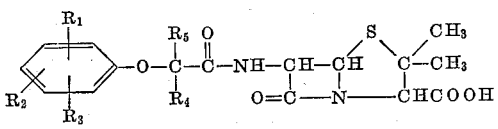

wherein $R_1$, $R_2$ and $R_3$ are each members selected from the group consisting of hydrogen, nitro, amino, (lower)alkylamino, di(lower)alkylamino, acylamino (where the acylating acid is an aliphatic carboxylic acid containing from one to ten carbon atoms inclusive and the substituent may thus also be named (lower)alkanoylamino), (lower)alkyl, chloro, bromo, iodo, (lower)alkoxy, hydroxy, sulfamyl, benzyl, cyclohexyl, cyclopentyl, and trifluoromethyl, and $R_4$ and $R_5$ are each members selected from the group consisting of (lower)alkyl (including, both here and above, straight and branched chain saturated aliphatic groups having from one to ten carbon atoms inclusive), phenyl and phenyl(lower)alkyl (including benzyl, α- and β-phenethyl and α-, β- and γ-phenylpropyl).

(h) *Dialkyl(substituted thio) type:*

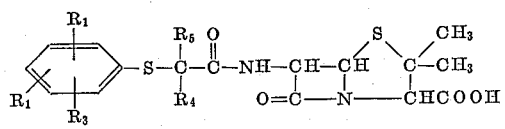

wherein $R_1$, $R_2$ and $R_3$ are each members selected from the group consisting of hydrogen, nitro, amino, (lower)alkylamino, di(lower)alkylamino, acylamino (where the acylating acid is an aliphatic carboxylic acid containing from one to ten carbon atoms inclusive and the substituent may thus also be named (lower)alkanoylamino), (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ and $R_5$ are each members selected from the group consisting of (lower)alkyl (including straight and branched chain saturated aliphatic groups having from one to ten carbon atoms inclusive) and cycloalkyl (e.g., cyclobutyl, cyclopentyl, cyclohexyl and cycloheptyl).

(i) *1-arylcycloalkyl and 9-substituted-9-fluorenyl types*:

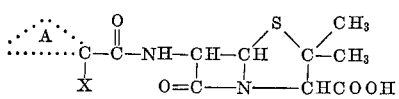

wherein Ring A is a member selected from the group consisting of cyclopentyl, (lower)alkylcyclopentyl, cyclohexyl, (lower)alkylcyclohexyl and 9-fluorenyl and X represents a member selected from the group consisting of (lower)alkoxy and

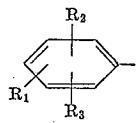

wherein $R_1$, $R_2$ and $R_3$ are each members selected from the group consisting of hydrogen, nitro, amino, (lower)alkylamino, di(lower)alkylamino, acylamino (where the acylating acid is an aliphatic carboxylic acid containing from one to ten carbon atoms inclusive and the substituent may thus also be named (lower)alkanoylamino), (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl.

(k) *Diaryl heterocyclic and miscellaneous types*:

These types are exemplified by the following penicillins: α,α-diphenyl-2-thienylmethylpenicillin, 9-p-methoxyphenyl-9-fluorenylpenicillin, 9-methoxy-9-fluorenylpenicillin, 9-ethoxy-9-fluorenylpenicillin, trichlormethylpenicillin, α-chloro-α-cyclohexylbenzylpencillin, α-bromo-α-ethylpropylpenicillin.

We claim:

1. A member selected from the group consisting of an acid having the formula

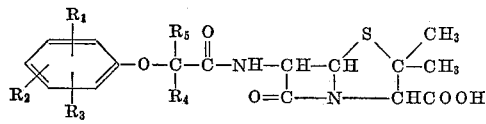

wherein $R_1$, $R_2$ and $R_3$ are each members selected from the group consisting of hydrogen, nitro, amino, (lower)alkylamino, di(lower)alkylamino, (lower)alkanoylamino, (lower)alkyl, chloro, bromo, iodo, (lower)alkoxy, hydroxy, sulfamyl, benzyl, cyclopentyl, cyclophexyl and trifluoromethyl, and $R_4$ and $R_5$ are each members selected from the group consisting of (lower)alkyl, phenyl and phenyl(lower)alkyl; and their sodium, potassium, calcium, aluminum and ammonium salts and their nontoxic substituted ammonium salts with an amine selected from the group consisting of tri(lower)alkylamines, procaine, dibenzylamine, N-benzyl-beta-phenethylamine, 1-ephenamine, N,N'-dibenzylethylene diamine, dehydroabietylamine and N,N'-bis-dehydroabietylethylenediamine.

2. A member selected from the group consisting of the acids having the formula

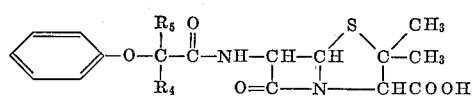

wherein $R_4$ and $R_5$ are each a (lower)alkyl group and their sodium, potassium, calcium, aluminum and ammonium salts and their nontoxic substituted ammonium salts with an amine selected from the group consisting of tri(lower)alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

3. A member selected from the group consisting of an acid having the formula

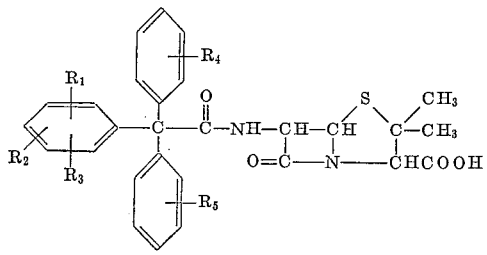

wherein $R_1$, $R_2$ and $R_3$ are each members selected from the group consisting of hydrogen, nitro, amino, (lower)alkylamino, di(lower)alkylamino, (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ and $R_5$ are each members selected from the group consisting of hydrogen, hydroxy, (lower)alkoxy and (lower)alkyl and its sodium, potassium, calcium and aluminum and ammonium salts and its nontoxic substituted ammonium salts with an amine selected from the group consisting of tri(lower)alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

4. A member selected from the group consisting of an acid having the formula

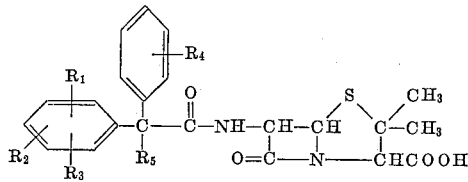

wherein $R_1$, $R_2$ and $R_3$ are each members selected from the group consisting of hydrogen, nitro, amino, (lower)alkylamino, di-(lower)alkylamino, (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ is a member selected from the group consisting of hydrogen, hydroxy, (lower)alkoxy and (lower)alkyl and $R_5$ represents a member selected from the group consisting of (lower)alkyl and cycloalkyl, and its sodium, potassium, calcium, aluminum and ammonium salts and its nontoxic substituted ammonium salts with amines selected from the group consisting of tri-(lower)alkylamines, procaine, dibenzylamine, N-benzyl-beta-phenethylamine, 1-ephenamine, N,N'-dibenzylethylenediamine, dehydroabietylamine and N,N'-dehydroabietylethylenediamine.

5. A member selected from the group consisting of an acid having the formula

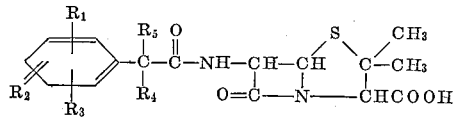

wherein $R_1$, $R_2$ and $R_3$ are each members selected from the group consisting of hydrogen, nitro, amino, (lower)alkylamino, di-(lower)alkylamino, (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ and $R_5$ are each members selected from the group consisting of (lower)alkyl and cycloalkyl, and its sodium, potassium, calcium, aluminum and ammonium salts and its substituted ammonium salts with nontoxic amines selected from the group consisting of tri(lower)alkylamines, procaine, dibenzylamine, N-benzyl-betaphenethylamine, 1-ephenamine, N,N'-dibenzylethylenediamine, dehydroabietylamine and N,N'-bis-dehydroabietylethylenediamine.

6. A member selected from the group consisting of an acid having the formula

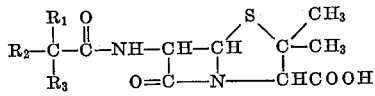

wherein $R_1$, $R_2$ and $R_3$ are each members selected from the group consisting of (lower)alkyl and cycloalkyl, and its nontoxic sodium, potassium, calcium, aluminum and ammonium salts, and its nontoxic substituted ammonium salts with an amine selected from the group consisting of tri(lower)alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

7. A member selected from the group consisting of an acid having the formula

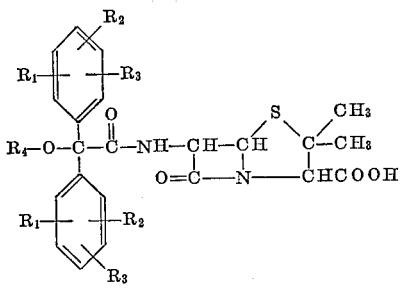

wherein $R_1$, $R_2$ and $R_3$ are each members selected from the group consisting of hydrogen, nitro, amino, (lower)alkylamino, di(lower)alkylamino, (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ represents a member selected from the group consisting of (lower)alkyl and cycloalkyl and its sodium, potassium, calcium, aluminum and ammonium salts and nontoxic substituted ammonium salts with amines selected from the group consisting of tri(lower)alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

8. A member selected from the group consisting of an acid having the formula

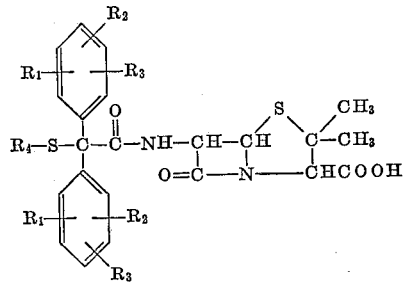

wherein $R_1$, $R_2$ and $R_3$ are each members selected from the group consisting of hydrogen, nitro, amino, (lower)alkylamino, di(lower)alkylamino, (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ represents a member selected from the group consisting of (lower)alkyl, cycloalkyl and aralkyl and its sodium, potassium, calcium, aluminum and ammonium salts and its nontoxic substituted ammonium salts, with amines selected from the group consisting of tri(lower)-alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

9. A member selected from the group consisting of an acid having the formula

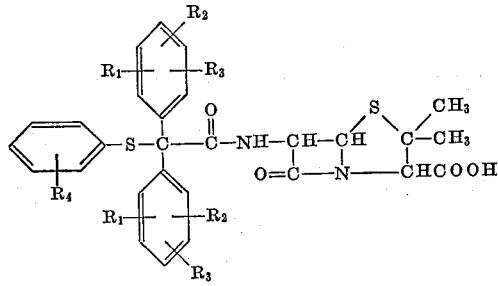

wherein $R_1$, $R_2$ and $R_3$ are each members selected from the group consisting of hydrogen, nitro, amino, (lower)alkylamino, di(lower)alkylamino, (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl, and $R_4$ is a member selected from the group consisting of hydrogen, hydroxy, (lower)alkoxy and (lower)alkyl, and its sodium, potassium, calcium, aluminum and ammonium salts and its nontoxic substituted ammonium salts with amines selected from the group consisting of tri(lower)alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

10. A member selected from the group consisting of an acid having the formula

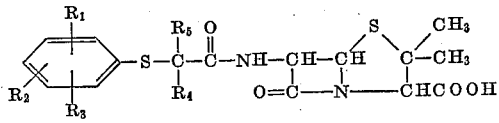

wherein $R_1$, $R_2$ and $R_3$ are each members selected from the group consisting of hydrogen, nitro, amino, (lower)alkylamino, di(lower)alkylamino, (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl and trifluoromethyl and $R_4$ and $R_5$ are each members selected from the group consisting of (lower)alkyl and cycloalkyl and its sodium, potassium, calcium, aluminum and ammonium salts and its substituted ammonium salts, with amines selected from the group consisting of tri(lower)alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

11. A member selected from the group consisting of an acid having the formula

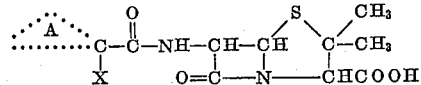

wherein Ring A is a member selected from the group consisting of cyclopentyl, (lower)alkylcyclopentyl, cyclohexyl, (lower)alkylcyclohexyl and 9-fluorenyl and X represents a member selected from the group consisting of (lower)alkoxy and

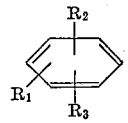

wherein $R_1$, $R_2$ and $R_3$ are each members selected from the group consisting of hydrogen, nitro, amino, (lower)alkylamino, di(lower)alkylamino, (lower)alkanoylamino, (lower)alkyl, fluoro, chloro, bromo, iodo, (lower)alkoxy, hydroxy, (lower)alkylthio, (lower)alkylsulfonyl, sulfamyl, benzyl, cyclohexyl, cyclopentyl, and trifluoromethyl, and its sodium, potassium, calcium, aluminum and ammonium salts and its substituted ammonium salts, with amines selected from the group consisting of tri(lower)-alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

12. 6-(α-phenoxy - α - methylpropionamido)penicillanic acid.

13. A member selected from the group consisting of the acids having the formula

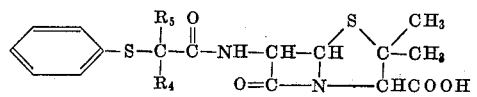

wherein $R_4$ and $R_5$ are each a (lower)alkyl group and their sodium, potassium, calcium, aluminum and ammonium salts and their nontoxic substituted ammonium salts with an amine selected from the group consisting of tri(lower)-alkylamines, procaine, dibenzylamine, N-benzyl-beta-phenethylamine, 1-ephenamine, N,N'-dibenzylethylenediamine, dehydroabietylamine and N,N'-bis-dehydroabietylethylenediamine.

References Cited by the Examiner
UNITED STATES PATENTS 2,941,995 6/1960 Doyle et al. _____ 260—239.1
3,079,306 2/1963 Offe et al. _____ 260—239.1

HENRY R. JILES, *Primary Examiner.*

JAMES W. ADAMS, *Assistant Examiner.*